(12) United States Patent
Staszel

(10) Patent No.: US 12,056,917 B2
(45) Date of Patent: Aug. 6, 2024

(54) DISTRIBUTED MANAGEMENT AND CONTROL IN AUTONOMOUS CONVEYANCES

(71) Applicant: INTELLIGENT DYNAMICS, LLC, Dearborn, MI (US)

(72) Inventor: Michael Anthony Staszel, Dearborn, MI (US)

(73) Assignee: INTELLIGENT DYNAMICS, LLC, Dearborn, MI (US)

( * ) Notice: Subject to any disclaimer, the term of this patent is extended or adjusted under 35 U.S.C. 154(b) by 559 days.

(21) Appl. No.: 17/062,495

(22) Filed: Oct. 2, 2020

(65) Prior Publication Data

US 2021/0103282 A1 Apr. 8, 2021

Related U.S. Application Data

(60) Provisional application No. 62/909,347, filed on Oct. 2, 2019.

(51) Int. Cl.
| | |
|---|---|
| *G06V 10/778* | (2022.01) |
| *B60W 30/09* | (2012.01) |
| *B60W 30/095* | (2012.01) |
| *B60W 60/00* | (2020.01) |
| *B63B 79/15* | (2020.01) |

(Continued)

(52) U.S. Cl.
CPC ......... *G06V 10/7784* (2022.01); *B60W 30/09* (2013.01); *B60W 30/0956* (2013.01); *B60W 60/0015* (2020.02); *B63B 79/15* (2020.01); *B63B 79/40* (2020.01); *B64C 39/024* (2013.01); *G05D 1/0088* (2013.01); *G05D 1/0206* (2013.01); *G05D 1/106* (2019.05); *G06F 18/2178* (2023.01); *G06V 20/58* (2022.01);

(Continued)

(58) Field of Classification Search
None
See application file for complete search history.

(56) References Cited

U.S. PATENT DOCUMENTS

| | | |
|---|---|---|
| 6,721,900 B1 | 4/2004 | Lenner et al. |
| 8,977,848 B1 | 3/2015 | Tomlinson et al. |

(Continued)

*Primary Examiner* — Aniss Chad
*Assistant Examiner* — Mahmoud M Kazimi
(74) *Attorney, Agent, or Firm* — Wegman Hessler Valore

(57) ABSTRACT

Disclosed subject matter identifies, characterizes, and mitigates previously unforeseen safety hazards that are likely to be encountered by autonomous conveyances—finding these hazards, assessing their potential safety impact, modifying the design to mitigate them should they occur, disseminating updated design programming to all units, including those under construction or those already in the field, and including those hazard mitigations of high severity that exceed the maximum capabilities of the controller as manufactured. These hazards can include rare, infrequent and unforeseen hazards by monitoring conveyances already in the field, gathering data from autonomous conveyances, such as those using a design being updated, and data obtained from those using other autonomous designs in the field. By obtaining data from non-autonomous conveyances, as supplied by their drivers and operators, reporting real-time via a smartphone application, categories of rare, infrequent or unforeseen hazards can be integrated into modified designs.

10 Claims, 24 Drawing Sheets

(51) Int. Cl.
  *B63B 79/40*   (2020.01)
  *B64C 39/02*   (2023.01)
  *G05D 1/00*    (2024.01)
  *G06F 18/21*   (2023.01)
  *G06V 20/58*   (2022.01)

(52) U.S. Cl.
  CPC ... *B60W 2420/403* (2013.01); *B64U 2201/10* (2023.01)

(56) References Cited

U.S. PATENT DOCUMENTS

| | | |
|---|---|---|
| 9,268,953 B2 | 2/2016 | Zhao et al. |
| 9,589,448 B1 | 3/2017 | Schneider et al. |
| 9,849,582 B2 * | 12/2017 | Cheff ............... B62B 3/02 |
| 9,849,852 B1 * | 12/2017 | Larner ............... B60R 21/0134 |
| 9,852,624 B2 | 12/2017 | Ginsberg et al. |
| 9,940,222 B2 | 4/2018 | Li et al. |
| 10,023,187 B2 | 7/2018 | Wulf |
| 10,139,828 B2 | 11/2018 | Ho et al. |
| 10,163,315 B2 | 12/2018 | Staszel |
| 10,210,759 B2 | 2/2019 | Stewart et al. |
| 10,289,114 B2 | 5/2019 | Mitchell et al. |
| 10,360,799 B2 | 7/2019 | Priev |
| 10,397,019 B2 | 8/2019 | Hartung et al. |
| 10,457,294 B1 | 10/2019 | Zhang et al. |
| 10,614,709 B2 | 4/2020 | Vozar et al. |
| 10,627,819 B1 | 4/2020 | Zhou et al. |
| 10,726,279 B1 | 7/2020 | Kim et al. |
| 10,726,303 B1 | 7/2020 | Kim et al. |
| 2018/0259966 A1 * | 9/2018 | Long ............... G05D 1/0246 |
| 2019/0051178 A1 * | 2/2019 | Priev ............... G05D 1/0285 |
| 2020/0035098 A1 * | 1/2020 | Vozar ............... G08G 1/0116 |

* cited by examiner

Method to Create New Mitigation(s) for Newly Identified Hazard(s) 1400

Method to Establish Remote Co-Processing Mode
1500

Method to Generate, Transmit and Confirm Flash
1600

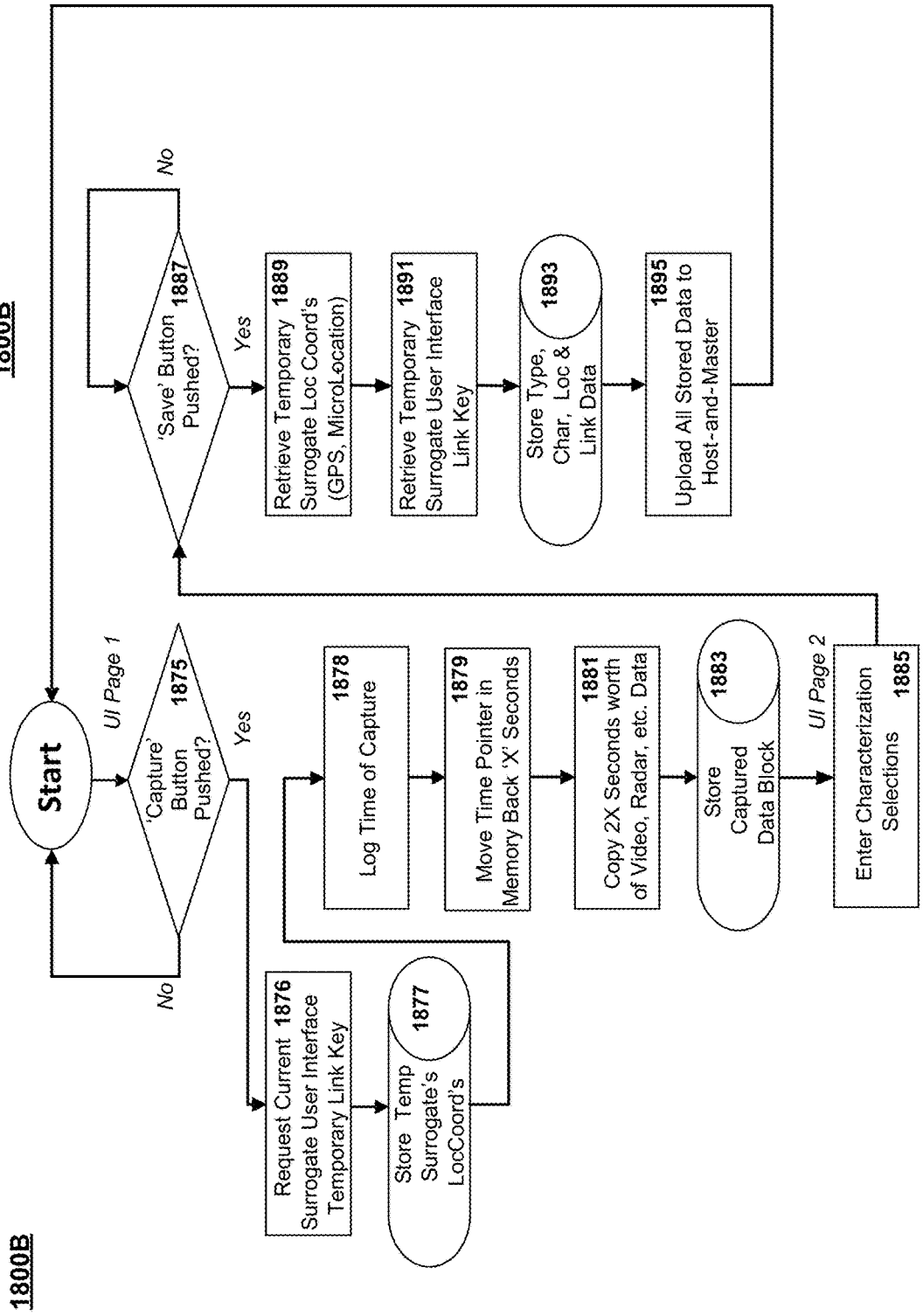

DISTRIBUTED MANAGEMENT AND CONTROL IN AUTONOMOUS CONVEYANCES

FIELD OF DISCLOSURE

The disclosed subject matter pertains to networked integration of control devices of autonomous conveyances, for example: the distributed management and control of autonomous conveyances utilizing networked control devices.

BACKGROUND

Control systems for autonomous conveyances can be 'taught' in a traditional sense, with programming code, as is the case most frequently with adaptive traditional control scenarios, or with fuzzy logic, but in the case of more advanced controls using such means as neural networks or quantum computers more often than not the desired 'training' is imparted by applying input patterns and then specifying the corresponding outputs that must result when those input patterns are encountered.

Control systems for autonomous conveyances can be 'taught' in a traditional sense, with programming code, as is the case most frequently with adaptive traditional control scenarios, or with fuzzy logic, but in the case of more advanced controls using such means as neural networks or quantum computers more often than not the desired 'training' is imparted by applying input patterns and then specifying the corresponding outputs that must result when those input patterns are encountered. The control system is usually also configured, when it is activated for the first time, to add its own individual learning as it goes forward, from the events and situations it experiences over time.

BRIEF SUMMARY

The inventor(s) has determined that traditional approaches to autonomous device control systems leave out the possibility of the inclusion of additional learning of a shared nature, that is, coming from other such systems deployed for the same purpose also in use in other locations, except through the occasional delivery and installation of traditionally-engineered software updates, generated by an engineer who has studied the shared learning and packaged it in the form of a formal software update.

The traditional approaches leave out the possibility of the inclusion of additional learning of a shared nature, that is, coming from other such systems deployed for the same purpose also in use in other locations, except through the occasional delivery and installation of traditionally-engineered software updates, generated by an engineer who has studied the shared learning and packaged it in the form of a formal software update.

One objective of disclosed embodiments is to provide real-time, or near real-time, shared learning updates for autonomous control of a large number of independent yet essentially identical vehicles, vessels, aircraft and/or machines, each performing the same functions in a predictable and cooperative fashion, generated, evaluated, tested, checked, validated, and managed by a centralized infrastructure. Since they are performing the same functions this learning will be identical, and via deployment over the network extended to every member of the class.

Lessons learned from one situation in one location are in short order made available to controllers in all locations to allow all to provide equivalent performance, and in particular, level of independently coordinated safety. In this manner control programming that can subsequently handle a large number of rare, infrequent or unforeseen situations is constructed and distributed quickly and comprehensively to all controllers.

Safety engineering is the process of predicting every possible fault and hazard and providing functionally correct programming to effectively deal with (mitigate) all of them.

Control systems, regardless of type, deliver their control capabilities based on a set of technical requirements, which traditionally are defined by an engineer or other technically competent individual. For autonomous systems, since safety is usually of prime importance, many of these requirements will be safety critical. Although the nature of common performance requirements can frequently be understood prior to initiating design, because they are an implicit part of the functionality of the device itself as initially conceived, this is not always the case for safety-critical requirements. Safety requirements spring from possible failures in the design or components (relatively easy to predict), it's intended usage (also relatively easy to predict), and unintended or unpredictable events or situations that arise during use (very difficult to predict).

Further embodiments of the present disclosure also provide the means to uncover these safety requirements and accommodate them, even after deployment into the field.

However, for rare or infrequent situations and/or events such situations and/or events may not be predictable, or even discernible or foreseen in advance. Furthermore, the desired outcomes should they occur may also not be foreseeable at the time of installation, or at convenient locations or intervals afterward. Hence uncovering, understanding and accommodating them in the design is very difficult beforehand, and at times nearly impossible afterward.

Therefore, for these events and situations in particular, but also usable for more traditional ones, a system and network is herein captured that monitors for their existence across geographical space and time, accumulates and characterizes data coming from them, generates update programming designed to handle them should they occur again in the future, and disseminates that programming across all instances in use. Each instance therefore benefits immediately from programming that has been verified to accommodate unusual events that occur only rarely and which may not be predictable beforehand.

Furthermore, should programming for the desired outcome exceed the capability of the processor, a measure of such processing can be handled by the infrastructure (see below).

A multiplicity of connected processors cooperatively delivering the maintenance, update and execution of autonomous control of vehicles, vessels, aircraft and/or machinery, is described. Connected in a hierarchical configuration they constitute two execution platforms, which are coupled for control. The first, an infrastructure forms the basis for the generation, maintenance, update, and control built upon a control platform, called herein 'host-and-master'. The second, a localized controller or set of controllers, executes the control algorithm set and provides updated learned situations back to the infrastructure and host-and-master. Independent monitors also provide a source for updating learned situations back to the infrastructure.

Initial configurations are anticipated to execute control only in the localized controllers. In these configurations the infrastructure is used to provide, maintain and update their programming, but not to control. Later configurations will see the execution of control algorithms spread across the network and including the infrastructure. The extent to which one or the other is used can depend in part, for at least some disclosed embodiments, on the evolution of the general communications infrastructure. i.e. wireless internet, 5G, etc.

Control algorithms are anticipated to increase in performance over time via the accumulation of experience by the infrastructure, from the members of the class, which will download updated ones to all localized controllers in the class as quickly as real-time.

Also described is a system for shared execution of learned programming over the network, and employing the infrastructure. Autonomous controls, particularly when used in safety critical situations, must accommodate all new and emerging hazards.

Traditionally safety analysis proceeds iteratively. An initial safety analysis is conducted based upon the performance expectations under consideration as the initial product or system design is being formulated. It is typically later revisited, usually multiple times, both before and after the product is deployed into the field. Each of these iterations require an extensive review of the existing safety approach used to date, and any modifications necessary, because of lessons learned since the last safety review.

The disclosure herein, in one or more embodiments, can be configured to deliver frequent and numerous, even continuous in at least one embodiment, safety design iterations, each spawned immediately and automatically as new hazards are uncovered, by the very systems (e.g., autonomous vehicle controller(s)) that will be the recipients of the next safety update.

A first set of embodiments described herein creates and manages a network of autonomous controllers in the field, using real-time, or near real-time, feedback and analysis to generate real-time, or near real-time, updates in the field, thus improving safety capability and reducing safety risk as the conveyances are used.

A second set of embodiments provided with this disclosure semi- or fully-automatically updates an initial or previous safety analysis performed on the autonomous controllers' functionality to determine if it is sufficient as-is, or requires its own update to mitigate previously unforeseen hazards that have arisen during those events and situations, thus improving safety capability and reducing safety risk as the conveyances are updated.

A third set of embodiments of the subject disclosure uses surrogates instead of actual target controllers to collect the data needed to feed this analysis and update process, either as a starting point prior to the existence of such target in-the-field controllers, or to supplement them when there are only a limited number in current use, thus improving safety capability and reducing safety risk as new conveyance designs are created and existing ones are updated.

A fourth set of embodiments disclosed herein provides co-processing services, to aid and work in conjunction with the controller functionality currently deployed in the field, to deliver for urgent or exceedingly high-risk and previously unforeseen hazards, hazard mitigations which are beyond the maximum capability of the hardware currently in the field if it continues to be used unaided, thus improving safety capability and reducing safety risk as the conveyances are updated.

A fifth set of embodiments of the subject disclosure provides amalgamation services, for the purposes of using lessons learned in rare, infrequent or unforeseen situations, and from rare, infrequent or unforeseen events, encountered in intended usage to autonomous controls applied outside this originally-intended usage, e.g. on-the-road conveyance lessons to off-road situations, or vessel situations to rail situations, as examples. This approach concentrates not on similarities in conveyances, but on similarities in events, situations and hazards, starting with similarities in objects and obstacles encountered, thus improving safety capability and reducing safety risk as new conveyance designs are created and existing ones are updated.

A sixth set of embodiments of the subject disclosure employs neural matrices in their native form to convey the data coming from the field, process it and create updated programming with new and updated mitigations, and return that programming to controllers in the field in updated form for the purpose of reducing turn-around time for the release of new updates after new hazards are found, thus improving initial quality (safety capability) and reducing safety risk as new conveyance designs are created and existing ones are updated.

Still further embodiments will become evident to ones of ordinary skill in the art in conjunction with the description provided throughout the specification, the associated drawings and appended claims.

BRIEF DESCRIPTION OF THE DRAWINGS

FIGS. 18, 18A and 18B depict respective flowcharts of example methods for submitting a hazard report on various disclosed user hazard reporting platforms;

Figure 1:
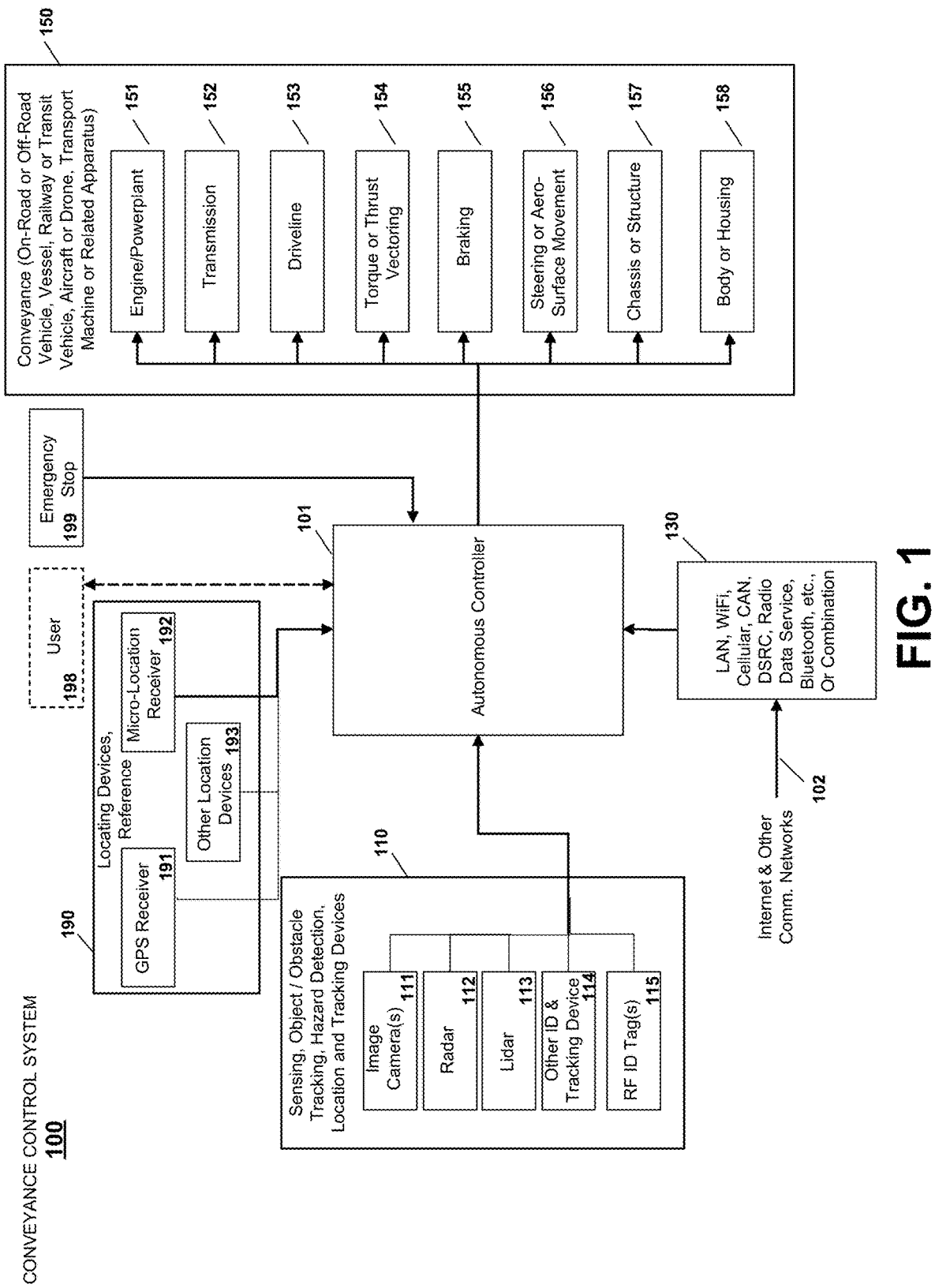
FIG. 1 depicts a diagram of an example autonomous conveyance, in a disclosed embodiment.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

DETAILED DESCRIPTION

Overview

All control systems, regardless of type, deliver their control capabilities based on a set of technical requirements, which are traditionally defined by an engineer or other technically competent individual. For autonomous systems since safety is usually of prime importance, and their main task is to detect and avoid striking obstacles, objects or people in their path, many or most of these requirements will be safety critical. The nature of common performance requirements can frequently be understood prior to initiating design, because they are an implicit part of the functionality of the device itself as initially conceived.

This is not always the case for safety-critical requirements. Safety requirements spring from the need to mitigate possible failures in the design or components (relatively easy to predict), it's intended use (also relatively easy to predict in most cases), and unintended or unpredictable events or situations that arise during use (very difficult to predict). The present disclosure provides enhanced means to determine all safety requirements and accommodate them, both before, and after, deployment into the field.

For a safety critical system, a safety analysis begins with an assessment of safety hazards that are likely to occur in the use of that system, including the following: a Safety Risk Analysis (SRA), which leads to generation of a safety concept and subsequently generation of system safety requirements. The safety analysis then involves generation of hardware safety requirements and generation of software safety requirements. From the hardware safety requirements and software safety requirements, then follows generation of a hardware safety design and generation of software safety programming.

In one or more embodiments, the subject matter described herein provides a safety control system for a plurality of autonomous conveyances, each of which is guided by a controller that directs autonomous operation of one or more of the autonomous conveyances. Operations directed by a controller can include navigation, propulsion, stopping and object avoidance functions of a conveyance, among others. In various embodiments, disclosed safety control systems integrate multiple controllers as both inputs to the safety control systems and as control subjects that can be modified, updated and the like in response to outputs there from. For example, in operation a disclosed safety control system(s) can generate an automated Safety Risk Analysis (SRA) in response to detected or reported safety-critical events and situations encountered as a conveyance operates. In several embodiments a second SRA is conducted using data from a relatively small subset of controllers connected to the system, so that the programming of a much larger subset of the controllers (e.g., all controllers, a suitable subset of controllers operating conveyances having a particular characteristic(s) or condition(s), and so forth) can benefit from their collective experiences. In at least one embodiment this second SRA can be conducted on data from other sources, called 'surrogates' herein, which will then be used to create or update an autonomous controller design, in the same (or similar) way and for the same (or similar) reason.

For infrequent or rare situations and/or events such situations and/or events may not be predictable, nor even discernible, nor foreseen in advance. Yet safety demands that they be accommodated as successfully as those that are more common, and more predictable. Furthermore, the desired outcomes should they occur may also not be foreseeable at the time of installation, or at convenient locations or intervals afterward. Uncovering, understanding and accommodating them in the design is very difficult beforehand, and nearly impossible afterward. Because of the rarity It is unlikely that many or most of the members of the class will see such an event or situation even during a lifetime of use but much more likely that a single member of the class will at some point. The disclosed embodiments provide the means for the infrastructure or the Software Professional to uncover these and easily and quickly accommodate them across all members of the class.

Autonomous controllers, usually individually but as is proposed here also in concert with each other, self-adjust their responses to inputs as events and situations unfold.

They begin, when initially powered up the first time, with a pre-determined and pre-loaded set of experiences within their programming that are likely to be seen in use. Furthermore, they are expected to adapt to events and situations that they come upon and adjust their future responses to accommodate the first of them encountered, as well as all others like it that follow.

The 'knowledge' that an autonomous controller accrues in this fashion is important to its future, but can also be critical to all of the other controllers within its class. Likewise, the knowledge accrued by others may be important to it.

Sharing of this knowledge provides the entire set the benefit of the learned knowledge of the others, some of it from common events and situations, but also from unique experiences. The invention described herein specifically searches for infrequent events, i.e. largely those unique to one controller but also those that no controller has experienced yet, with the goal of providing all of them the means to handle them successfully. This learning-by-extension provides all of them with the benefits experienced by the others when they've successfully handled a rare, infrequent or unforeseen event.

Specifically, the rare or infrequent events and situations of interest herein are those that involve current and future decisions about the correct and safe action to execute in response when safety-critical events occur, or within safety-critical situations.

To update the existing design its Safety Concept, System Safety Requirements, Hardware Safety Requirements, Software Safety Requirements, and the relationship between them are reviewed in response to the analysis described above, either by skilled personnel, or in at least one embodiment of the invention documented herein, automatically.

Because all aspects of hardware in the controller are fixed at manufacture only Software Safety Requirements can be modified or updated easily in the field, via flashing of new programming, as is described under this invention, below.

In most situations all other safety-related changes or updates require new or additional hardware, which can only be handled by swapping out the existing hardware, i.e. the controller itself. However, within the invention described herein a methodology for handling them is also included. See below for details.

Remote flashing over the internet, or other network, as seen in prior art and common usage, is used to convey update programming to controllers in the field.

Controllers, either individually (self-) or as a class under the direction of a Software Professional (remotely-), adjust their response to inputs as events and situations unfold. A carefully designed network enables communication between them, or between a Software Professional with changes and them, to allow on-the-fly updates, both formal (people-generated) and informal (machine generated), to be propagated to all controllers in the field, extending to every member of the class and benefiting from the individually-learned experience of every member of the class. The professional benefits from seeing the self-adjusting action of the individual controllers as input to his/her programming update.

Control systems for autonomous conveyances can be 'taught' in a traditional sense, with programming code, as is the case most frequently with traditional adaptive control scenarios, or with fuzzy logic or other similar technologies, but in the case of more advanced controls such as neural networks or quantum computers more often than not the desired 'training' is imparted by applying sets of inputs that are expected to be seen, and then specifying corresponding outputs (actions) that are to take place when those sets are next experienced by the controller. Assembling the complete collection of sets of inputs, and their corresponding outputs, constitutes the "design" and "program generation" portions of the design process.

Once deployed, neural network-based controllers not only execute this initial programming but experience additional sets of inputs, for which they have no programming as yet. A good portion of these are irrelevant to their task, having nothing to do with navigating successfully amongst obstacles and by rules-of-the-road, however some of which are likely to be resulting from events and situations for which they have not yet been prepared. The most infrequent of these are the ones covered under this invention.

Neural Nets encapsulate their programming and learning in a different way than traditional adaptive control scenarios, or with fuzzy logic or other similar technologies. For this reason, substantial advantages accrue by processing programming and updates natively to them, that is in the form of Neural Matrices. Unlike programming code and the data upon which it operates neural nets hold 'programming', learning and the input and output (resultant) data together in such matrices.

The embodiments provided herein processes neural matrices in native form, adding updates, then returning them in that form to the controller. Note that one special type of update results from combining the knowledge captured in the neural nets of two or more individual controllers. All the rare or infrequent situations or events that they have encountered are easily combined with the same collected from the rest of their peers to create a superset matrix, which subsequently carries the sum of the knowledge of all of them, and is quite easily disseminated to all for all to gain from.

As control devices for operating conveyances humans have developed over time an array of skills that is the target for those designing autonomous controllers that are intended to replace them in the operator role. Due to the breadth and depth of that set of skills those who design such controllers can only take a best guess, as a starting point, for the controller development process.

This invention, as captured herein, recognizes the nature of that set of skills and modifies the controller development process to include a means for incorporating them. The methodology described here actively courts human input regarding the performance of autonomous systems, and in particular, situations and events that may cause autonomous systems great trouble.

In traveling aboard such conveyances humans are invited to report on events and situations that, in their opinion, have not been handled safely. Data used in characterizing these situations is obtained from the controllers themselves and forwarded to the Host-and-master, along with the report, for remote analysis. This provides a rich data set to be used for the purpose of improving control capability in these controllers.

However, humans have more to contribute under this invention. They are also invited to report on events and situations that arise in traditionally operated conveyances, i.e. those with operators present. These conveyances are considered herein to be surrogates to autonomous control. Consequently, and in the same fashion, reporting from humans, including the operators of these surrogates, passengers within them, if any, passersby, and even on-site first responders, along with data characterizing the events and situation, is also forwarded for remote analysis, with the same or similar intended outcome. In this way the experiences of those executing non-autonomous control provide their real-world feedback to improve the state of the art in autonomous control.

Therefore, in particular for rare or infrequent events and situations encountered by autonomous conveyances in use and surrogates thereof, but also usable for more traditional ones, a system and network is described herein for the purpose of monitoring for their existence across geographical space and time, accumulating and characterizing data coming from them, generating update programming designed to handle them should they occur again in the future, and disseminating that programming, whether people-generated or machine-generated, across all instances in use. Thus, each instance benefits immediately from programming that has been verified to accommodate both easily anticipated events and unusual events that occur only rarely, and which may not be predictable beforehand.

Described thus far is the use of data generated by one of more of the members of the class for the purpose of creating, verifying and distributing update programming. Various disclosed embodiments also support the collection, characterization, management and use of equivalent data, not generated by members of the class deployed in the field, but from surrogates. This data can come from a number of sources that are not other members of the class and still be used by the infrastructure in the process of generating updates for the class. This capability supports the initial design of a class, prior to having any class members in place and enhanced use of the class before more of its members have been placed in the field.

Surrogates are most often non-autonomous conveyances fitted with sensing systems similar to those used on autonomous ones, but are not used for control of the conveyance, only for data acquisition. The data acquired by these conveyances can have many uses, such as recording road surface anomalies for relay to repair crews, or recording the location of temporary police situations to inform drivers nearing their location that they exist and are likely to delay traffic as a result. In this case it is used to characterize hazards, especially area ones, that autonomous conveyances could come upon in normal usage, for the purpose of updating their programming to account for them.

Real-world data available from members of the class, or from surrogates, is also used by the network to update the initial safety analysis, which was used to create the first cut at the safety design for the members of the class, and follow-up safety analyses. Subsequent discoveries about the nature of events and situations that were initially or previously unforeseen, obtained from a subset of the set of members of the class, or a single member of the class for rare or infrequent events and situations, or surrogates, provides the means to update previous safety analyses to allow them to mitigate these unforeseen hazards in future updates.

Embodiments described herein permit the safety update process to occur more quickly and more often than conventional approaches that depend on manual compilation of software or code embodying the correction or improvement to controller operation. In at least one embodiment the update process can be executed continuously, starting a new analysis immediately after the last one has been completed, with the release of updated programming to the field. In yet another embodiment, multiple update processes can at least in part, be implemented concurrently with other update processes. For instance, a first process particular to a subset of controllers, a subset of conveyances, or a subset of field conditions can be analyzed while a second process pertaining to another subset of controllers/conveyances/field conditions (or the like) is also being analyzed, or correction routines are being developed or the correction codes are being released for field programming, and so forth. It should be appreciated that other iterations or combinations of concurrent risk analysis, update/correction development, and field programming known to one of ordinary skill in the art or reasonably conveyed to one of ordinary skill by way of the context provided herein, are considered within the scope of the present disclosure.

With complex systems such as autonomous controllers used in complex environments unforeseen safety hazards may well exist but be as yet undetected. Upon discovery they demand immediate attention, otherwise harm could easily occur to people, animals, or expensive objects or infrastructure. Historically programming updates to mitigate them have traditionally been generated and released via formal software updates. This update process frequently takes time. During that time the general public is exposed to the unmitigated hazard without a solution in place, permitting dangerous conditions to exist, with the likelihood of injury or death resulting. Real-time updates support the closure of hazardous open issues quickly and comprehensively.

In addition to being a framework for investigation and subsequent generation and delivery of updates, the Distributed Management and Control System for Comprehensive Safety in Autonomous Conveyances is itself a computing platform optimized to support autonomous control. One embodiment allows actual programming to be run on it, in conjunction with code on the class members, to deliver temporary updates that are not initially wholly supportable on those members. Temporary execution of such distributed code in this fashion allows the immediate closure of hazardous issues while a more permanent fix is being constructed.

This scheme without co-processing is primarily designed to handle the generation, and successful transmission and installation of update programming, consisting of updated software. This means that new hazards uncovered that cannot be mitigated by software alone remain hazardous. In the long term, and if the risk is substantial enough, new hardware is sent to the field, to replace that in current use and mitigate the hazards locally, removing the temporary use of co-processing.

A short-term alternative is also captured herein. If the hazard is serious enough, and the risk of damage occurring from it high enough, a stop-gap solution can be considered for deployment, to be used until updated hardware can be prepared and disseminated (think Takata Air Bag Inflator recall).

The solution captured herein uses co-processing, between an infrastructure and the controller in the field, to extend the controller beyond its initial design capability. Co-processing means that some portion of the task of identifying hazards, and instituting mitigations for them, is conducted not on the controller, but on a remote processor within the infrastructure (generally in the host-and-master, but perhaps in other devices on or along the network). In such a situation this remote processor acts in concert with the portion that is within the controller, real-time, with data and resulting actions being moved back and forth over the network between the infrastructure and the controller.

Development and update processes in product design, and in safety-critical systems, are iterative. That is, the design effort approaches its intended goals only by repeated improvement of the design, through iterative cycles of development, validation test, and deployment.

Improved safety (e.g., reduced exposure to risk for passengers and bystanders, humans, pets, other animals, and expensive infrastructure, vehicles or equipment, all of which must not be harmed as autonomous conveyances operate, and so forth) results from embodiments of the present disclosure for several reasons. First, from a reduction in time to completion for a comprehensive safety case by finding and mitigating unforeseen and less frequently seen (rare) safety hazards more quickly than traditional means. Second, by completion of more comprehensive safety analyses, due to utilization of shared, extensible learning by finding and fixing more issues more quickly. Third, disclosed systems and methods conduct a more comprehensive safety analyses by repeating this iterative process more often (e.g., by performing more update cycles in less time). Fourth, by reducing turn-around time for each update cycle via safety process automation over real-time network connection and using neural matrix form if available (e.g., more update cycles in less time). Still further, by mitigating hazards that can temporarily exceed the hardware capability of the controller for previously unforeseen hazards that are exceedingly high-risk (e.g., mitigating hazards that could not previously be handled).

Description of Illustrated Embodiments

FIG. 1 illustrates an embodiment of a conveyance control system 100 comprising a monitoring and control device 101. This system 100 executes data acquisition and control functionality for the control of a conveyance (on-road or off-road vehicle, vessel, railway or transit vehicle, aircraft drone, or spacecraft, transport machine or apparatus) autonomously, that is without an operator or driver of the conveyance actively controlling the conveyance, either locally or remotely. This device is most frequently a controller with adaptive learning functionality added, or one based upon fuzzy logic, or employing one or more neural networks or quantum computers to execute an autonomous control scheme local to a single conveyance.

This system 100 is built upon a common logic architecture, which includes such devices as microcontroller-based embedded controllers, and communications networks, such as the internet or wireless internet, WAN, LAN, WiFi, Internet, Cellular Network, CAN, DSRC, Bluetooth, other network, or combination of these 130 to execute the tasks required to perform the controller's functionality, and to communicate with outside devices via the local or wide-area network 102. It purposely has much commonality with such devices and systems.

The fundamental purpose for the system pictured in FIG. 1 is to control a conveyance autonomously, that is, of and on its own and without a human operator running the conveyance. In this context control can have a variety of functions or contextual applications, including: successfully carrying cargo or passengers, navigating complex previously established paths, from a start point to an end, avoiding objects or obstacles that must not be collided with or harmed, and obeying traffic, air traffic control laws, harbor transit, etc. laws and regulations, as well as common courtesy expectations of human drivers of non-autonomous conveyances.

This system 100 includes an input interface 102 which provides inputs to said monitoring and control device from a set of sensors 210 providing data characterizing the nature, position, direction of movement and speed of surrounding and nearby objects, persons, animals, and vehicles, and the road surface, lane markings, and edges if on-road, waterway boundaries if on a river, air traffic control corridors if in the air, etc. These can include one or more of the following: video cameras 111, radar 112, lidar 113, and other identification and tracking devices 114, or devices such as RF ID tags 115.

System 100 includes a set of locating devices 190 for the purpose of tracking the conveyance's position in the air or on the earth's surface, and with respect to fixed or moving objects or obstacles, whose position is known, or within or near buildings, tunnels, boundaries, etc. These can include GPS 191 and Micro-location sources 192, and others 193 as yet unimplemented in common usage.

It also includes an output interface 150 carrying outputs from said monitoring and control device to the key physical control inputs and mechanisms for the conveyance. These include the powerplant or engine 151, transmission 152, driveline 153, torque or thrust vectoring unit or units 154, braking system 155, steering or aero-surface manipulation system 156, chassis or structure control system 157, and body or housing function control systems 158, the actions of which it controls.

The means to accept and implement remote flash programming is present internally to controllers and used to update them quickly when in the field so as to reduce safety risk by fielding new hazard mitigations as quickly as possible after they are determined to be needed.

A simple user interface can be provided in the form of at least one emergency stop button or mechanism. Such a button or mechanism 199 is depicted within system 100 to allow passengers or other occupants inside the conveyance, or first responders or passersby outside it, to stop the operation of the conveyance should it malfunction, or present another type of hazard, or be about to encounter a hazard for which it apparently had been provided (as perceived by those occupants or passersby) with no obvious means to avoid.

In at least one embodiment this system 100 also features user interfaces with more complexity 198, one or more of them, allowing passengers of the conveyance (inside), or first-responders or passersby (outside) to provide details about an emergency stop event or situation, should emergency stop be activated (inside or outside), or about a close-call safety event or situation, i.e. one not requiring an emergency stop (inside).

In at least one embodiment is seen the addition of means to the controller design to create an ability in each controller to co-process data over a network while executing control functionality, either on a regular basis or continuously, with a remote, centralized processor handling analysis, and providing in return, instructions for mitigating any new hazards found.

In another embodiment a subsystem of the system 100 seen in FIG. 1, optionally without the autonomous control functionality present, i.e. a surrogate, is used for the purpose of gathering data to be used in designing a new autonomous control system that has not yet been fielded.

In another embodiment that general subsystem of the system 100 seen in FIG. 1, optionally without the autonomous control functionality present, is used for the purpose of gathering data to supplement the analysis coming from a limited number of controllers in the field, before the entire set is deployed.

Figure 2:
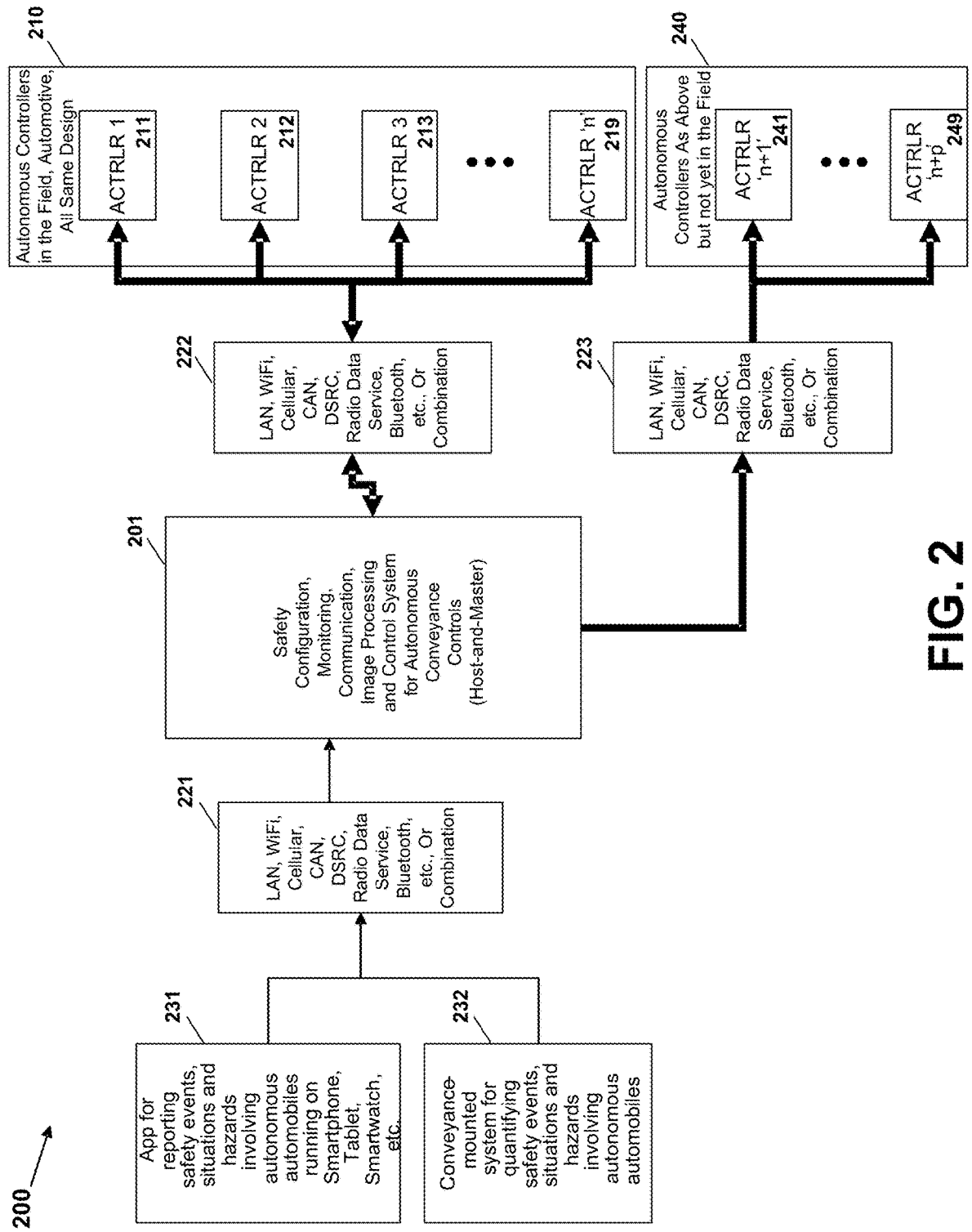
FIG. 2 illustrates a diagram of a sample networked controller architecture for monitoring and updating control programming of autonomous conveyance controllers.

FIG. 2 illustrates an embodiment of a management and control system for the infrastructure hosting the Distributed Management and Control System for Comprehensive Safety in Autonomous Conveyances 200 as depicted in FIGS. 2, and 6 through 8, most of which is not seen in prior art or common usage. It is built upon a common logic architecture, which includes but is not limited to such devices as the personal computer, the tablet, or the smartphone, or an array of such devices, and communications networks, such as the internet or wireless internet, to execute the tasks required to perform the infrastructure's functionality, and purposely has much commonality with such systems frequently seen and described in prior art and common usage.

The figure also illustrates a multiplicity of monitoring and control devices from FIG. 1, constituting a class, the members of which are each identical in construction and programming, but independent in their learned history as a result of encountering different paths, experiences, events and situations in their usage to date. The example shown depicts two subsets of these controllers, the first consisting of those already deployed in the field and constituting a fleet of automobiles 210. The second comprises identical controllers not yet deployed 240.

FIG. 2 also shows a system 201, within this document hereafter called host-and-master, for managing the set of controllers, whether under construction or out in the field. The fundamental purpose of the system seen in this figure is to monitor and maintain the set of control devices at any time, before or after being deployed in the field. Traditionally a service technician has provided updates to these kinds of controllers via temporary, local, direct service connection to the vehicle containing the controller.

More recent prior art and common usage demonstrates doing so remotely using a communications network that interconnects them, either temporarily or permanently, to provide these updates, which is the method captured in FIG. 2. It enables real-time, or near real-time, updates to be deployed in the field.

FIG. 2 also illustrates an infrastructure, made up of the host-and-master 201, network interfaces 221, 222 and 223, and user interfaces, 231 and 232, for coordinating the data acquisition, safety analysis, design update, programming, configuration and setup of these same devices, managed both independently but also as a coordinated set. It supports the querying of each device in the set for the purpose of retrieving it's learned experiences, for the purpose of using those unique experiences, and all others like them obtained from the other members of the class, to execute a follow-on safety analysis, and later to create and deploy updated programming for improved performance and safety based upon it.

The set of controllers in the field 210 is used as a data acquisition system for the purpose of logging and retrieving general lessons learned, and most specifically, those related to safety-critical events and situations. This accomplished by evaluating each controller's lessons learned, as retrieved from its memory, either at regular intervals or continuously, to review the events and situations it has encountered so that evidence of new and previously unseen hazards can be logged and studied. The logged data is studied for the purpose of updating the previous safety analysis of the deployed system and the resulting safety functionality to mitigate these hazards, should they appear again, to conveyances using any of the already deployed controllers of the same design.

This data includes, from FIG. 1 via the imaging cameras 111, or radar 112 or lidar 113 devices, the data and data patterns they generate in use, and is characterized by the reference location data obtained via GPS 191, micro-location 192 or other locating subsystems 193.

It also includes information and data supplied by passengers, first-responders, or passersby who have experienced these events, situations and hazards while either being transported by the conveyance (inside), or in proximity to it (outside) when the event, situations or hazards have taken place. Two means for recording and forwarding this information and data are captured in FIG. 2. The first is an application (app) 231 for reporting safety-critical events, situations and hazards involving autonomous automobiles running on a Smartphone, Tablet, Smartwatch, etc. The second is a conveyance-mounted system with a user interface 232 for doing the same if the app, or device it executes on, is not available at the time the event, situation or hazard is logged.

Figure 6:
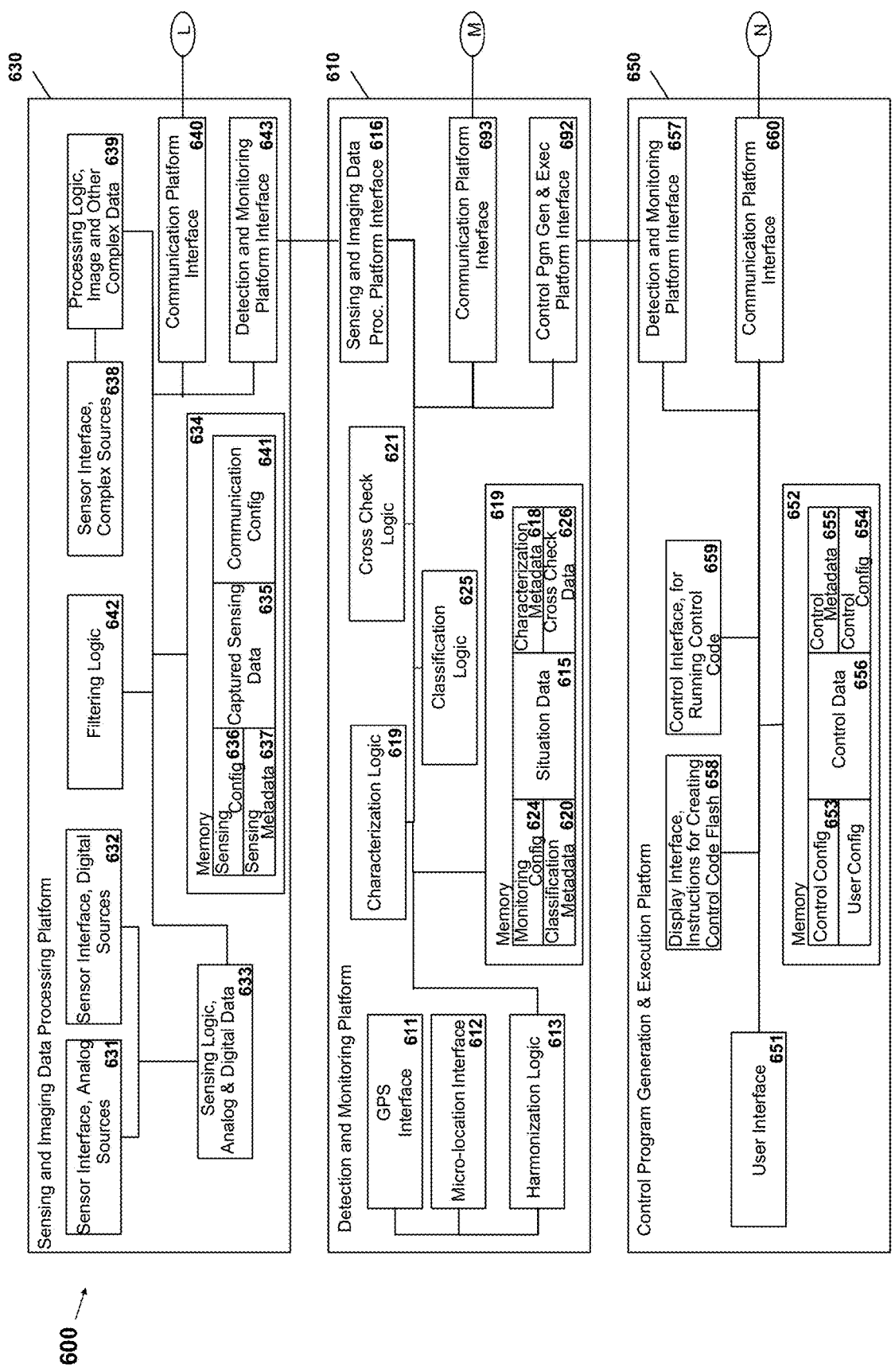
FIGS. 6 and 7 depict block diagrams of components of a hazard identification and control generation platform according to further embodiments disclosed herein.
Figure 7:
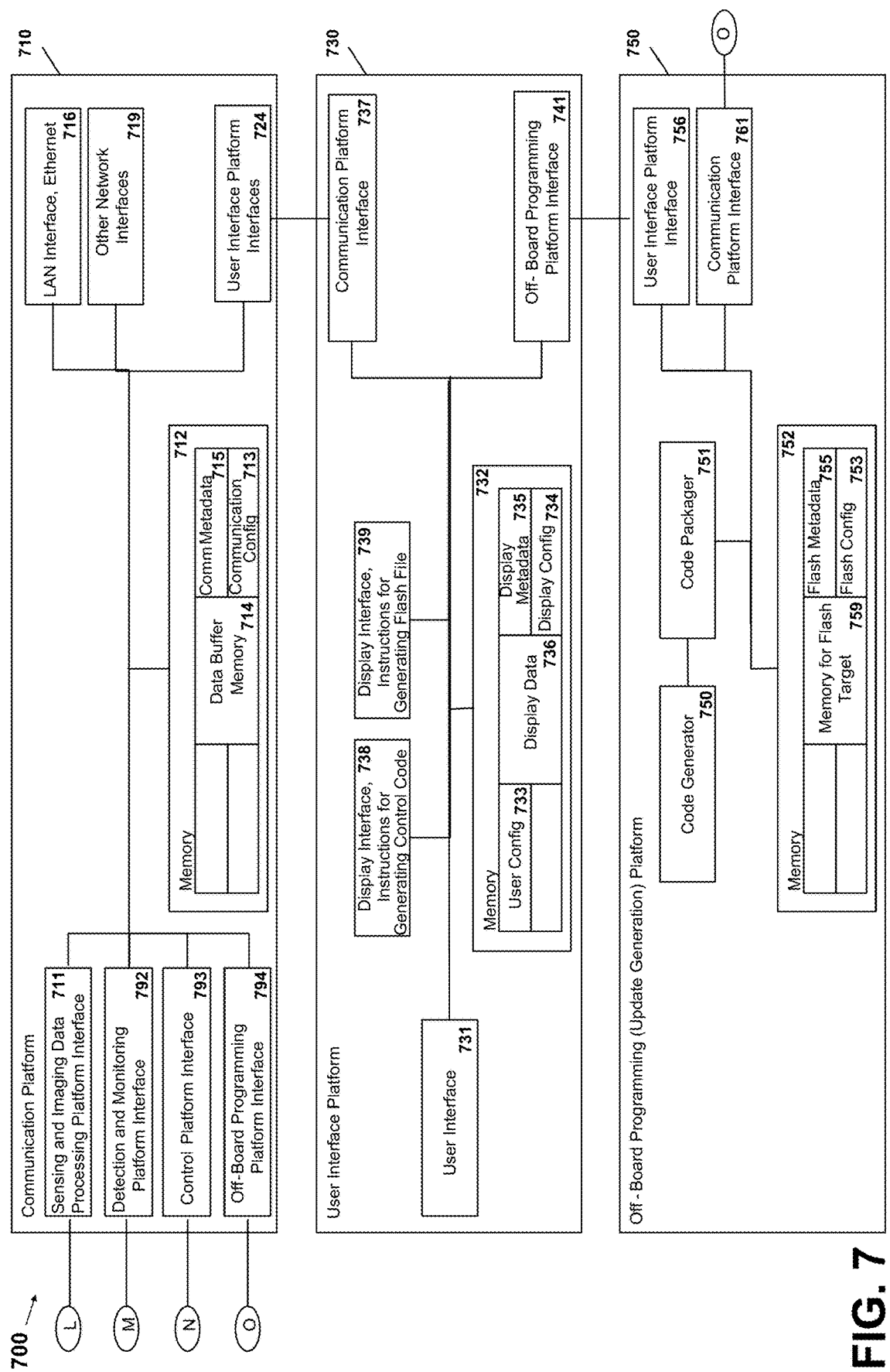

FIGS. 6 and 7 depict one example novel hardware architecture 600 and 700 according to embodiments of the present disclosure for the host-and-master 201, as pictured in FIG. 2.

Figure 3:
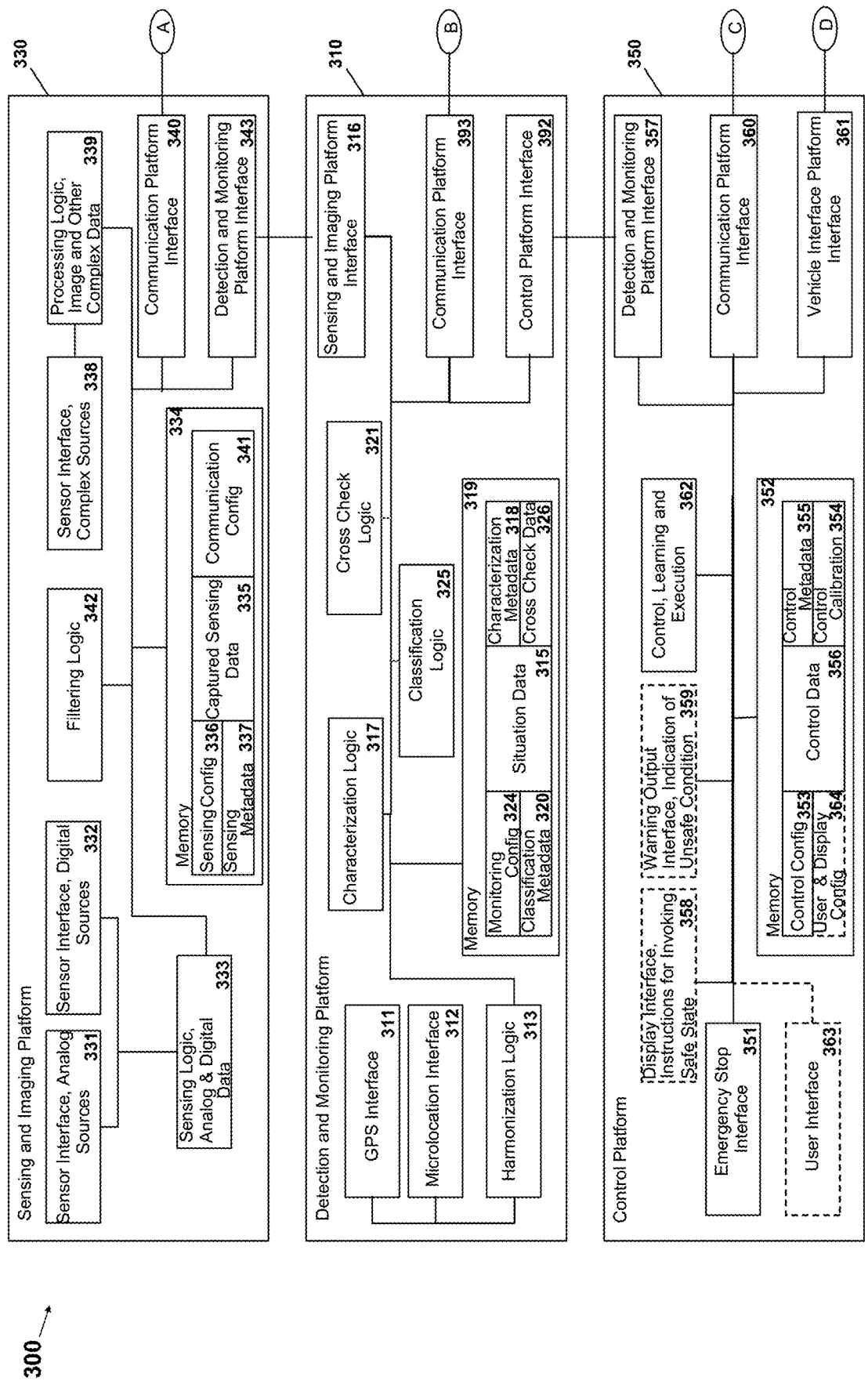
FIGS. 3 and 4 illustrate block diagrams of components of an autonomous conveyance controller, according to disclosed embodiments.
Figure 4:
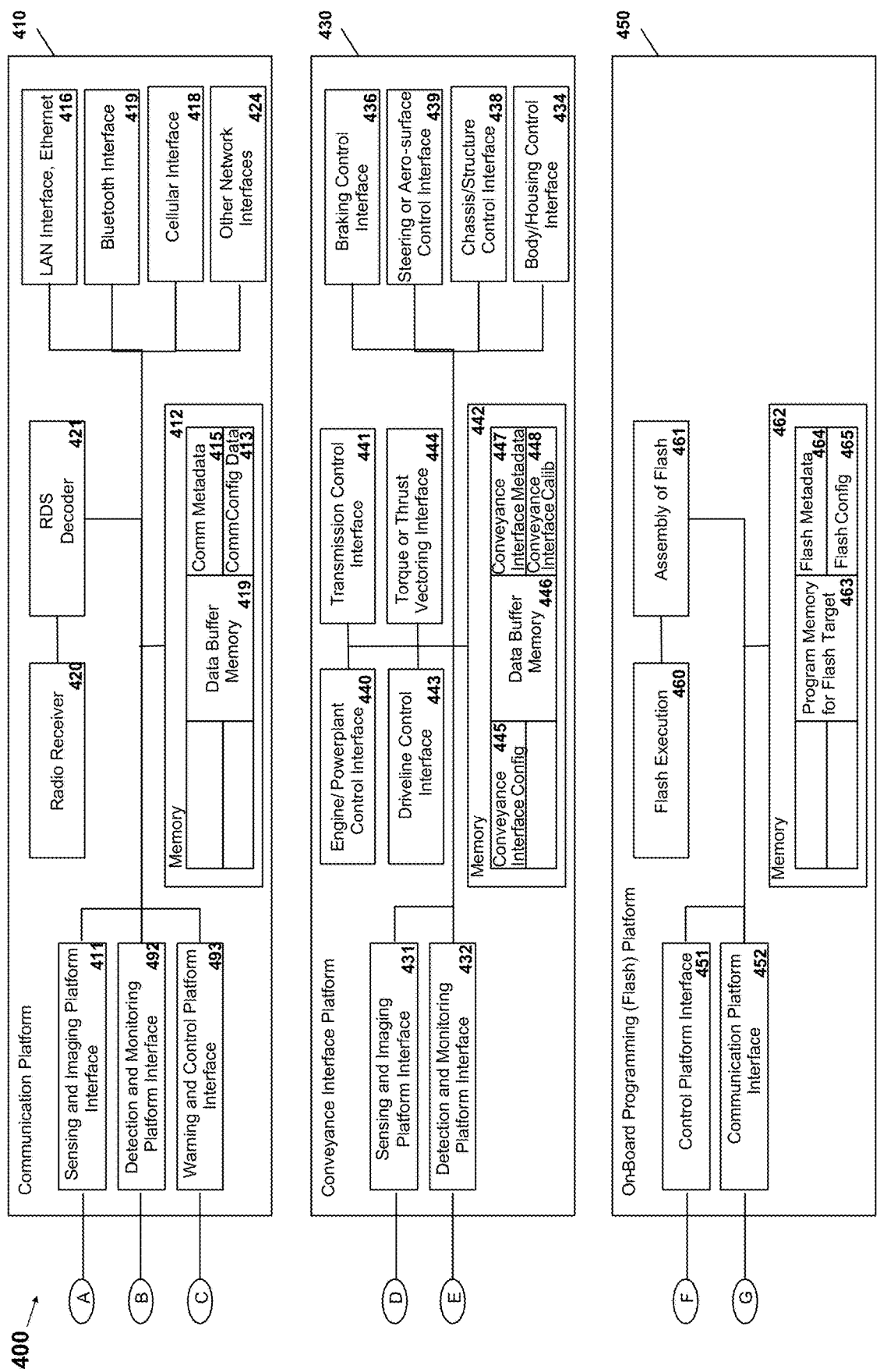

FIGS. 3 and 4 depict a further example hardware architecture of the autonomous controller 101, of the system 100 pictured in FIG. 1, according to additional embodiments of the present disclosure.

Taken together FIGS. 3 and 4 together illustrate an embodiment 300 and 400 of an autonomous controller with a common logic architecture to execute the tasks required to perform the controller's functionality, most of which is found in prior art or common usage, as well as additional hardware uniquely added to support the functionality of one or more aspects of the disclosure provided herein. This embodiment consists of a Detection and Monitoring Platform 310, a Sensing and Imaging Platform 330, a Control Platform 350, a Communications Platform 410, a Conveyance Interface Platform, 430, and an On-Board Programming (Flash) Platform 450.

Within the Detection and Monitoring Platform 310 a GPS interface 311 retrieves coarse location information from a GPS Receiver within the conveyance for the purpose of determining the coarse geographical location of said conveyance. An additional micro-location interface 312 is provided within this platform for the purpose of retrieving fine location information from a micro-location source if a very precise or indoor location fix is necessary. These two forms of location data are used in order to provide an accuracy of location sufficient to monitor successfully to a minimum distance of 10 cm as well as in basic confirmation of agreement on coarse location. Harmonization logic 313 is employed to reconcile data from the two in order to provide a specific set of location coordinates.

This embodiment can contain characterization logic 317 for the purpose of discriminating between individual objects and obstacles, between individual potential hazards, and between these two types.

Characterization of hazards is not seen in prior art or common usage, but is a novel aspect of the embodiments presented herein, and has been added to the characterization logic in order to support safety analysis.

Disclosed embodiments can also contain classification logic 325 for the purpose of providing a quantification of Safety Criticality Level (SCL) for each hazard or potential hazard being monitored. The classification logic 325 is also novel to the embodiments presented herein, and not seen in prior art or common usage.

Also newly presented herein, autonomous controller 300/400 can contain cross check logic 321 for the purpose of comparing specific values contained within information provided by and received from multiple sources of object, obstacle and hazard data in order, together with the classification logic and harmonization logic, to determine the corresponding most probable true values when such data is not consistent between sources. This logic combination also performs analysis to determine if any source of data is likely to be reporting data that is untrue, providing an elementary level of security protection from 'spoofed' (intentionally incorrect) data being treated as though it is true. This is also novel to the embodiments described herein.

Detection and Monitoring Platform 310 can further contain a Sensing and Imaging Platform interface 316 employing logic to manage the cooperative exchange of data with the Sensing and Imaging Platform 330. This interface is the source of data local to the Detection and Monitoring Platform 310 and coming from the Sensing and Imaging Platform 330. It is also the destination local to the Detection and Monitoring Platform 310 for commands going to the Sensing and Imaging Platform 330.

Autonomous controller 300/400 can also contain a Control Platform interface 392 employing logic to manage the cooperative exchange of data with the Control Platform 350. This interface is the source of data local to the Detection and Monitoring Platform 310 and coming from the Control Platform 350. It is also the destination local to the Detection and Monitoring Platform 310 for data and commands going to the Control Platform 350.

This embodiment can also contain a Communication Platform interface 393 employing logic to manage the cooperative exchange of data with the Communication Platform 410. This interface is the source of data local to the Detection and Monitoring Platform 310 and coming from the Communication Platform 410. It is also the destination local to the Detection and Monitoring Platform 310 for data and commands going to the Communication Platform 410.

Detection and Monitoring Platform 310 can also contain local Memory 319 used to temporarily store data and calculated values used within the Detection and Monitoring Platform 310 such as Situation Data 315, Characterization Metadata 318, Classification Metadata 320, Cross Check Data 326, and Monitoring Configuration Data 324.

Within the Sensing and Imaging Platform 330 two basic sensor interfaces and one complex sensor interface are used to relay data from sensors external to the platform, yet fitted to the host device after manufacture, or those manufactured into the host device by its manufacturer. A Sensor Interface for Analog 331 receives sensor signals from analog sensors and converts them to digital form, and a logically equivalent Sensor Interface for Digital Sources 332 receives sensor data from digital sensors. Both sources feed digitized data to Sensing Logic for Analog and Digital Data 333 whose purpose is to manage the timing and protocol of the data acquisition process. Filtering Logic 342 is used to remove noise and/or unwanted interference from the data.

Sensor and Imaging Platform 330 can additionally include a Sensor Interface for Complex Sources 338, which is used to manage data interchange with complex sensing devices such as cameras, imagers, lidar, and other forms of complex detection. This interface feeds data to processing logic 339 which is present in order to distill usable information about objects, and obstacles to be avoided, and hazards and potential hazards being monitored obtained from the complex datasets provided by these devices, as well as to send commands to them for the control of the sensing process.

This embodiment also contains a Detection and Monitoring Platform interface 343 employing logic to manage the cooperative exchange of data with the Detection and Monitoring Platform 310. This interface is the source of data local to the Sensing and Imaging Platform 330 and coming from the Detection and Monitoring Platform 310. It is also the destination local to the Sensing and Imaging Platform 330 for data and commands going to the Detection and Monitoring Platform 310.

A Communication Platform interface 340 employing logic to manage the cooperative exchange of data with the Communication Platform 410 can also be provided for Sensing and Imaging Platform 330. This interface is the source of data local to the Sensing and Imaging Platform 330 and coming from the Communication Platform 410. This data typically consists of information from sensors remote to the Sensing and Imaging Platform 330, frequently also remote as to the host-and-master 201 itself.

This embodiment also contains local Memory 334 used to temporarily store data and calculated values used within the Sensing and Imaging Platform 330 such as Captured Sensing Data 335, Sensing Configuration Data 336, Sensing Metadata 337, and Communications Configuration Data 341.

Within the Control Platform 350 are found optional warning and user interfaces. The warning interface, if employed, provides instructions to occupants or passengers within the conveyance in the event of a need to evacuate the conveyance due to its involvement in an accident, or other hazardous situation. Moreover, an emergency stop interface 351 can be provided to enable an occupant/passenger or a bystander to cause the autonomous controller 300/400 to perform a predetermined safety action, such as stop the conveyance, move to a nearest safe location and stop the conveyance, open doors to allow evacuation of the conveyance, and so forth (e.g., see emergency stop 199 of FIG. 1, supra).

The user interface 363 is a novel element disclosed herein and has been included as part of the illustrated embodiment(s) to allow the occupants, passengers (inside) or first responders or passersby outside to report hazards or unsafe behavior they see involving the conveyance, especially if the autonomous controller does not appear to be recognizing or mitigating them.

In various embodiments, Control Platform 350 can include a complex Display Interface 358, if the optional user interface 363 is present, used to generate and provide instructions to the user for invoking or achieving a safe state when the conveyance is in the presence of a hazard and not detecting or mitigating it, and a Warning Output Interface 359, if the optional user interface 363 is present, for the purpose of relaying the existence of any unsafe condition to the occupants (inside), passengers or first responders or passersby (outside).

Control Platform 350 can also include a Detection and Monitoring Platform interface 357 employing logic to manage the cooperative exchange of data with the Detection and Monitoring Platform 310. This interface is the source of data local to the Control Platform 350 and coming from the Detection and Monitoring Platform 310. It is also the destination local to the Control Platform 350 for data and commands going to the Detection and Monitoring Platform 310.

A Communication Platform interface 360 employing logic to manage the cooperative exchange of data with the Communication Platform 410 can also be included within Control Platform 350. This interface is the source of data local to the Control Platform 350 and coming from the Communication Platform 410. It is also the destination local to the Control Platform 350 for data and commands going to the Communication Platform 410. Also provided is a Vehicle Interface Platform Interface 361 for enabling Communication Platform 350 to communicably and operably connect with a vehicle interface platform of an associated conveyance.

This embodiment also contains local Memory 352 used to temporarily store data and calculated values used within the Control Platform such as User Configuration Data 353, Warning Configuration Data 354, Warning Metadata 355, and Hazard Mitigation Data 356.

Within the Communication Platform 410 are found a radio subsystem and several network interfaces. A radio receiver 420 is included and present for the purpose of receiving broadcast radio signals containing encoded hazard information provided by local authorities and local news sources. This receiver outputs received radio signals to an RDS decoder 421 for the purpose of demodulating the incoming detected radio signal to extract the encoded hazard information.

Also included in this embodiment(s) are a LAN Interface 416 establishing a communication link with the various forms of Ethernet networks (e.g., IEEE 802.11x, or any other suitable example), a Bluetooth Interface 419 for localized communications with RF ID tags and other devices, a cellular interface 418 for linkage to one of more cellular communications networks, and other network interfaces 424 for as-yet undefined services, topologies, and physical layers to come forth from the communications infrastructure in the future.

Communication Platform 410 can also contain a Sensing and Imaging Platform interface 411 employing logic to manage the cooperative exchange of data with the Sensing and Imaging Platform 330. This interface is the source of data local to the Communication Platform 410 and coming from the Sensing and Imaging Platform 330. It is also the destination local to the Communication Platform 410 for data and commands going to the Sensing and Imaging Platform 330.

In one or more embodiments, Communication Platform 410 also contains a Detection and Monitoring Platform interface 492 employing logic to manage the cooperative exchange of data with the Detection and Monitoring Platform 310. This interface is the source of data and commands local to the Communication Platform 410 and coming from the Detection and Monitoring Platform 310. It is also the destination local to the Communication Platform 410 for data going to the Detection and Monitoring Platform 310.

In still further embodiments, Communication Platform 410 contains a Control Platform interface 493 employing logic to manage the cooperative exchange of data with the Control Platform 350. This interface is the source of data local to the Communication Platform 410 and coming from the Control Platform 350. It is also the destination local to the Communication Platform 410 for data and commands going to the Control Platform 350.

Communication Platform 410 also contains local Memory 412 used to temporarily store data and calculated values used within the Communication Platform 410 such as Data Buffer Memory 419, Communications Configuration Data 413, and Communications Metadata 415.

Within the Conveyance Interface Platform 430 are found interfaces to the subsystems in the conveyance that initiate and control its movement as it travels along its route. The subsystem interfaces can vary as a function of conveyance in which autonomous controller 300/400 is deployed, in various embodiments. As one specific example, Conveyance Interface Platform 430 can comprise an Engine/Powerplant Control Interface 440, Driveline Control Interface 443, Transmission Control Interface 441 and Torque or Thrust Vectoring Interface 444. Moreover, one or more of the following: a Braking Control Interface 436, Steering or Aero-surface Control Interface 439, Chassis/Structure Control Interface 438 and Body/Housing Control Interface 434 can be provided, as suitable. Other subsystem interfaces not specifically depicted but adapted to provide specific communication capabilities to particular types or categories conveyances can be provided as well. A sensing platform interface 431 can be provided to employ logic to manage the cooperative exchange of data with Sensing and Imaging Platform 330, and a Detection and Monitoring Platform Interface 432 can be provided to employ logic to manage the cooperative exchange of data with Detection and Monitoring Platform Interface 310, analogous to similar interfaces (e.g., Sensing and Imaging Platform Interface 316; Detection and Monitoring Platform Interface 357, etc.) described elsewhere herein. Local Memory 442 can also be provided for Conveyance Interface Platform 430, in an embodiment, to temporarily store data and calculated values used within Conveyance Interface Platform 430 such as conveyance interface configuration data 445, data buffer memory 446, conveyance interface metadata 447 and conveyance interface calibration data 448, as some examples.

Within the On-Board Programming (Flash) Platform 450 is found logic responsible for accepting and loading flash programming received from the host-and-master. On-Board Programming (Flash) Platform 450 can comprise a Flash Execution Module 460 and Assembled Flash Memory 461, e.g., a read-only memory (ROM) structure programmed with initial instructions in a first portion of Flash Memory 461 upon manufacture, with additional Flash Memory portions 461 for further programming or updates in the field. In some embodiments, Assembled Flash Memory 461 can be a read-write memory that can be written, erased or overwritten to accommodate field updates. A Control Platform Interface 451 can be provided to employ logic to manage the cooperative exchange of data with Control Platform 350, and a Communication Platform Interface 452 can also be provided to employ logic to manage the cooperative exchange of data with Communication Platform 410. Local Memory 462 can be provided for On-Board Programming (Flash) Platform 450 in further embodiments to temporarily store data and calculated values used within On-Board Programming (Flash) Platform 450 such as Program Memory for Flash Target 463, Flash Metadata 464 and Flash Configuration data 465.

Figure 5:
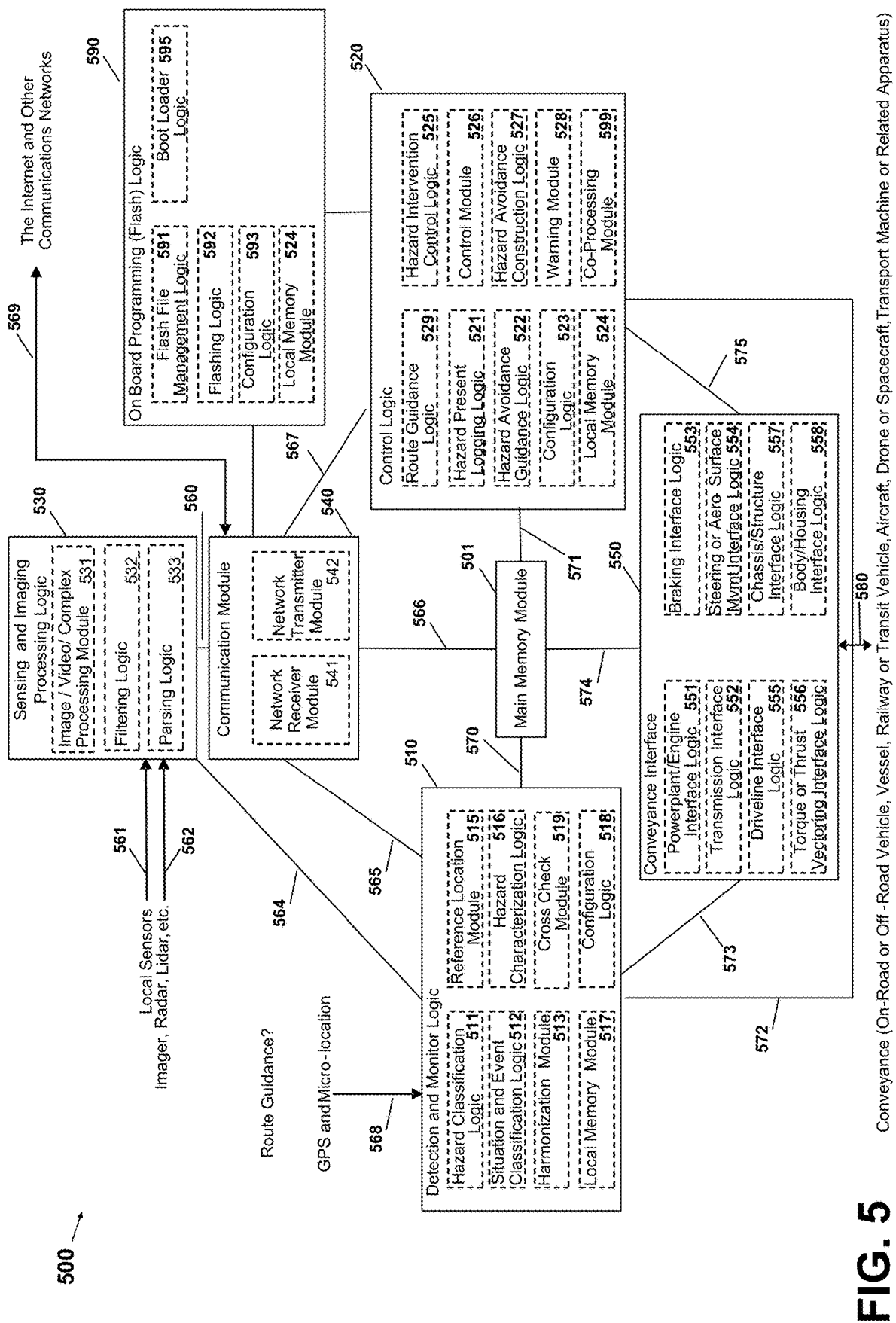
FIG. 5 illustrates a block diagram of example control logic for the autonomous conveyance controller of FIGS. 3 and 4, in an embodiment.

FIG. 5 depicts an example software architecture 500 running on the hardware seen in FIGS. 3 and 4 according to various embodiments of the present disclosure. In the depicted embodiment(s), FIG. 5 illustrates an embodiment of an autonomous controller 500 with a common communications and execution architecture to execute the tasks required to perform the functionality typically employed in the autonomous operation of conveyances. It consists of a Main Memory Module 501, Detection and Monitor Logic 510, Control Logic 520, Sensing and Image Processing Logic 530, a Communications Module 540, and a Conveyance User Interface 550.

Within the Sensing and Image Processing Logic 530 are one module and logic for the processing of incoming signals and data such as from local sensors 561. Filtering Logic 532 is present for the purpose of excluding or removing noise and unwanted information from all incoming signals and data streams. Parsing Logic 533 is also present, this for the purpose of extracting encoded sensor data from the protocol information surrounding it and added to it in order to support transmission over the General Network 569 or by other encoded means.

This embodiment also has present an Image and Video Complex Processing Module 531 for the purpose of extracting information about objects, obstacles, hazards, and potential hazards from images, still and moving, including those taken in the visible light, infrared or ultraviolet spectra, or similar data taken using radar, lidar, sonar or other similar means 562.

This embodiment also has present the means that allow the transfer of data to and from the Detection and Monitor Logic 510, including transfer of commands from the Detection and Monitor Logic that govern data acquisition and transfer of data to the Detection and Monitor Logic in return 564, and the Communications Module 540, including but not limited to incoming sensor data received 560 from the General Network 569, or other networks or means.

Within the Detection and Monitor Logic 510 is found logic that conducts and controls monitoring of objects, obstacles, hazards and potential hazards, executing four major functions. It also includes modules, also providing four major functions. A Reference Location Module 515 is present for the purposes of establishing the precise geographic location of the conveyance. This is performed by processing signals forwarded 568 from Global Positioning System and Micro-location systems in or near the host, GPS providing coarse and primarily outdoor location data, and Micro-location providing fine and, if necessary, indoor location data.

Also within the embodiment is Hazard Characterization Logic 516, which processes data about objects, obstacles, hazards and potential hazards in order determine where they are, if they are moving, in which direction they are moving if they are, and the type of object, obstacle or hazard that they represent.

Additional logic, labeled Hazard classification Logic 511, is uniquely present when the controller is used within the Distributed Management and Control System for Comprehensive Safety in Autonomous Conveyances to determine the Safety Criticality Level (SCL) of each hazard and potential hazard.

Also within the embodiment is a Harmonization Module 513, which is present for the purpose of comparing similar or same information from multiple sources in order to determine the most precise estimate of the actual measurement from which the data has come. One example of harmonization is the comparison of GPS and Micro-location data 568 in order to arrive at the most accurate estimate of actual location possible. Since both have some inherent error in their estimates melding the two together in the harmonization process results in reduction of the total error below that of either one individually.

Also within the embodiment is a Cross Check Module 519 which compares similar or same information from multiple sources as well, however unlike the Harmonization Module this module conducts its comparison in order to determine if a harmonized version can be created when there is a significant difference in the data provided by them. It is also present to weed out spoofed (purposely inaccurate data) that may be generated by sources that cannot be confirmed as trustworthy.

Also found within this embodiment is a Local Memory Module 517, which handles storage of interim values during the execution of the functionality within the Monitor Logic, and Configuration Logic 518, which is used to set up the Monitor Logic prior to use. The Control Logic 520 is provided with data 567 from the Communications Module.

Within this embodiment is Route Guidance Logic 529, a key part in any autonomous control methodology. This logic handles the planning and execution of each journey the conveyance undertakes, from start finish, and at a high level. It determines and manages travel, planning which path(s) to take to get from Point A to Point B, and then following it.

Also within this embodiment is Hazard Present Logging Logic 521, which keeps track of hazards encountered as they appear, ensuring that in case more than one appears at a time, they are all handled in order of severity, and also ensuring that they are all processed before the conveyance is allowed to moves any further along its route.

Within this embodiment is also found Hazard Avoidance Guidance Logic 522, which plots a temporary, short distance routing around any hazard that is encountered, mitigating the hazard, most often by avoiding it. This logic also places the conveyance back on its original routing as soon as the hazard is handled.

Hazard Intervention Control Logic 525, is included within this embodiment in case the conveyance itself is the source of a hazard. An example would be the case where a part, or mechanism, or a subset of a conveyance's systems has failed. This logic works with the conveyance control system to mitigate the hazard by pitting the conveyance in a safe state. This state could be one where it is positioned out of traffic or obstacles and not moving.

Also within this embodiment is a Control Module 526. This module handles upper level execution of autonomous driving tasks while taking input from the others around it. It is responsible for the management of the execution of all other logic and modules, and for executing the route plan.

Hazard Avoidance Commands Construction Logic 527 is present to construct the sequence of commands, i.e. the high-level programming, required to successfully traverse the programmed route, and any deviations necessary to avoid obstacles and hazards along the way.

Also found within this embodiment is a Local Memory Module 524, which handles storage of interim values during the execution of the functionality within the Control Logic, and its Configuration Logic 523, which is used to set up the Control Logic prior to use.

A Warning Module 528 is present in this embodiment to create warnings that can be sent via communications link to other systems within the conveyance, or to the host-and-master as an alert, to trigger their need to act upon the appearance of a hazard. Warnings can be sent out over the General Network 569 with the assistance of the Communication Module 540 via data transmitted to it 567.

Also within this embodiment is a Co-Processing Module 599. This module works together, in co-processing mode, with the host-and-master to receive commands from the host-and-master for the control system to manage and execute, and provide data back to the host-and-master about the current status of the conveyance, its surroundings, and any obstacles or hazards it is encountering, as it encounters them.

Also found within this embodiment is a Local Memory Module 524, which handles storage of interim values during the execution of the functionality within the Warning Logic, and Configuration Logic 523, which is used to set up the Warning Logic 528 prior to use. The Control Module 520 and the Detection and Monitor Module 510 frequently exchange data 572 in the course of the execution of the functionality found within the two.

Within the Communication Module 540 are receiver and transmitter modules. Within this embodiment a Network Receiver Module 541 is provided to process commands, messages and data received over the General Network. Also provided is a Network Transmitter Module 542, this for the purpose of processing commands, messages and data that is to be transmitted over the General Network. These modules are capable of handling receiving and transmitting over all communication variants defined under the concept of the General Network described herein, including all forms of Ethernet (IEEE 802.11x), all forms of Bluetooth, all Cellular Network protocols, all CAN protocols, and will be expected to handle any other new and related network communications concepts that are forthcoming. The Communication Module sends data to and receives data from 564 the Monitor Logic, sends data to and receives data from 560 the Sensing Logic, and sends data to and receives data from 567 the Warning Logic during the execution of the functionality found within the three.

Within the optional Conveyance User Interface 550, and novel to the disclosed embodiments, is placed the functionality necessary to allow the occupants, passengers (inside the conveyance) or first responders or passersby (outside) to identify, log and transmit perceived hazards or unsafe behavior they see involving the conveyance, especially if the autonomous controller does not appear to be recognizing or mitigating them.

Within the Main Memory Module 501, is found memory that is shared among all Logic units and the Communication module, transmitted and received locally to or from 570 the Monitor Logic, to or from 566 the Communication Module, to or from 571 the Warning Logic, and to or from 574 the User Interface. This memory handles storage of interim values and values to be transmitted or received within the Localized Safety Space Monitor during the execution of the functionality within it.

FIGS. 6 and 7 depict an example hardware architecture 600 and 700 of the device at the heart of the system pictured in FIG. 2, such as the host-and-master device 201, according to novel embodiments of the present disclosure.

Taken together FIGS. 6 and 7 together illustrate an embodiment 600 and 700 of a data acquisition, information management, and control system with a common-logic architecture to execute the tasks required to perform the system's functionality. This embodiment consists of a Detection and Monitoring Platform 610, a Sensing and Imaging Data Processing Platform 630, a Control Program Generation & Execution Platform 650, a Communications Platform 710, a User Interface Platform, 730, and an Off-Board Programming (Update Generation) Platform 750.

Within the Detection and Monitoring Platform a GPS interface 611 retrieves coarse location information from the Autonomous Controller within the conveyance for the purpose of determining the coarse geographical location of the conveyance. An additional micro-location interface 612 is provided within this platform for the purpose of retrieving fine location information from the Autonomous Controller if a very precise or indoor location fix is necessary. These two forms of location data are used in order to provide an accuracy of location sufficient to monitor successfully to a minimum distance of 10 cm as well as in basic confirmation of agreement on coarse location. Harmonization logic 613 is employed to reconcile data from the two in order to provide a specific set of location coordinates This embodiment also contains characterization logic 619 for the purpose of discriminating between individual objects and obstacles, between individual potential hazards, and between these two types. Characterization of hazards is not seen in prior art on common usage, but is unique to this invention, and has been added to the characterization logic in order to support safety analysis.

This embodiment also contains classification logic 625 for the purpose of providing a quantification of Safety Criticality Level (SCL) for each hazard or potential hazard being monitored, also not seen in prior art or common usage.

This embodiment also contains cross check logic 621 for the purpose of comparing specific values contained within information provided by and received from multiple sources of object, obstacle and hazard data in order, together with the classification logic and harmonization logic, whether controllers in the field or other sources, to determine the corresponding most probable true values when such data is not consistent between sources. This logic combination also performs analysis to determine if any source of data is likely to be reporting data that is untrue, providing an elementary level of security protection from 'spoofed' (intentionally incorrect) data being treated as though it is true. This is also unique to the invention described herein.

This embodiment also contains a Sensing and Imaging Data Processing Platform interface 616 employing logic to manage the cooperative exchange of data with the Sensing and Imaging Data Processing Platform 630. This interface is the source of data local to the Detection and Monitoring Platform and coming from the Sensing and Imaging Data Processing Platform. It is also the destination local to the Detection and Monitoring Platform for commands going to the Sensing and Imaging Data Processing Platform.

This embodiment also contains a Control Program Generation and Execution Platform interface 692 employing logic to manage the cooperative exchange of data with the Control Program Generation and Execution Platform 650. This interface is the source of data local to the Detection and Monitoring Platform and coming from the Control Program Generation and Execution Platform. It is also the destination local to the Detection and Monitoring Platform for data and commands going to the Control Program Generation and Execution Platform.

This embodiment also contains a Communication Platform interface 693 employing logic to manage the cooperative exchange of data with the Communication Platform 710. This interface is the source of data local to the Detection and Monitoring Platform and coming from the Communication Platform. It is also the destination local to the Detection and Monitoring Platform for data and commands going to the Communication Platform.

This embodiment also contains local Memory 619 used to temporarily store data and calculated values used within the Detection and Monitoring Platform such as Situation Data 615, Characterization Metadata 618, Classification Metadata 620, Cross Check Data 626, and Monitoring Configuration Data 624.

Within the Sensing and Imaging Data Processing Platform a two basic sensor interfaces and one complex sensor interface are used to relay data from sensors external to the platform, yet fitted to the host device after manufacture, or those manufactured into the host device by its manufacturer. A Sensor Interface for Analog Sources 631 receives sensor signals relayed by the controller or other source from analog sensors which has been converted to digital form, and a logically equivalent Sensor Interface for Digital Sources 632 receives sensor data relayed by the controller or other source from digital sensors.

Both sources feed digitized data to Sensing Logic for Analog and Digital Data 633 whose purpose is to characterize the timing and protocol of the data acquisition process. Filtering Logic 642 is used to remove noise and/or unwanted interference from the data, should it be present.

This embodiment also contains a Sensor Interface for Complex Sources 638, which is used to manage data interchange through the controller or other source with complex sensing devices such as cameras, imagers, lidar, and other forms of complex detection. This interface feeds data to processing logic 639 which is present in order to distill usable information about objects, and obstacles, items to be avoided protected, and hazards and potential hazards being monitored obtained from the complex datasets provided by the controllers or other sources, as well as to send commands to them as necessary for the remote control of the sensing process, if used.

This embodiment also contains a Detection and Monitoring Platform interface 643 employing logic to manage the cooperative exchange of data with the Detection and Monitoring Platform 610. This interface is the source of data local to the Sensing and Imaging Data Processing Platform and coming from the Detection and Monitoring Platform. It is also the destination local to the Sensing and Imaging Data Processing Platform for data and commands going to the Detection and Monitoring Platform.

This embodiment also contains a Communication Platform interface 640 employing logic to manage the cooperative exchange of data with the Communication Platform 710. This interface is the source of data local to the Sensing and Imaging Data Processing Platform and coming from the Communication Platform. This data typically consists of information from sensors remote to the Sensing and Imaging Data Processing Platform, e.g., from controllers in the field or other sources, frequently also remote to the host itself.

This embodiment also contains local Memory 634 used to temporarily store data and calculated values used within the Sensing and Imaging Data Processing Platform such as relayed Captured Sensing Data 635, Sensing Configuration Data 636, Sensing Metadata 637, and Communication Configuration Data 641.

Within the Control Program Generation & Execution Platform 650 is found the user interfaces. The user interface 651 is present to allow users to configure the disclosed embodiments, to initiate data acquisition, to execute analysis of the data, to generate updated programming for controllers in the field, and to launch and confirm the correct execution of the remote flash process for updating controllers, whether they are currently in the field or not yet there.

This embodiment also contains a complex Display Interface 658, novel to embodiments of the present disclosure, used to generate and provide instructions to the user, and a Control Interface 659, for Running Control, for the purpose of relaying the existence of any unsafe condition to the occupants (inside), passengers or first responders or passersby (outside).

This embodiment also contains a Detection and Monitoring Platform interface 657 employing logic to manage the cooperative exchange of data with the Detection and Monitoring Platform 610. This interface is the source of data local to the Control Program Generation & Execution Platform and coming from the Detection and Monitoring Platform. It is also the destination local to the Control Program Generation & Execution Platform for data and commands going to the Detection and Monitoring Platform.

This embodiment also contains a Communication Platform interface 660 employing logic to manage the cooperative exchange of data with the Communication Platform 710. This interface is the source of data local to the Control Program Generation & Execution Platform and coming from the Communication Platform. It is also the destination local to the Control Program Generation & Execution Platform for data and commands going to the Communication Platform.

Within the User Interface Platform 730 are found display interfaces for generating control codes and instructions for generating flash programming files. A user interface 731 is provided coupled with display interface, instructions for generating control code 738 and display interface, instructions for generating flash file 739. A communication platform interface 737 is provided for communicative coupling to communication platform 710, and an off-board programming platform interface 741 is provided for communicative coupling with off-board programming (update generation) platform 750. Additionally, local memory 732 is provided including user configuration data 733, display data 736, display metadata 735 and display configuration data 734.

This embodiment also contains local Memory 652 used to temporarily store data and calculated values used within the Control Program Generation & Execution Platform such as User Control Configuration Data 653, Control Configuration Data 654, Control Metadata 355, and Control Data 656. Within the Communication Platform 710 are found a radio subsystem and several network interfaces.

Also included in this embodiment are a LAN Interface 716 establishing a communication link with the various forms of Ethernet networks (IEEE 802.11x), and other network interfaces 719 for as-yet-undefined services, topologies, and physical layers to come forth from the communications infrastructure in the future.

This embodiment also contains a User Interface Platform interface 724 employing logic to manage the cooperative exchange of data with the User Interface Platform 730. This interface is the source of data local to the Communication Platform and coming from the User Interface Platform. It is also the destination local to the Communication Platform for data and commands going to the User Interface Platform.

This embodiment also contains a Sensing and Imaging Data Processing Platform interface 711 employing logic to manage the cooperative exchange of data with the Sensing and Imaging Data Processing Platform 630. This interface is the source of data local to the Communication Platform and coming from the Sensing and Imaging Data Processing Platform. It is also the destination local to the Communication Platform for data and commands going to the Sensing and Imaging Data Processing Platform.

This embodiment also contains a Detection and Monitoring Platform interface 792 employing logic to manage the cooperative exchange of data with the Detection and Monitoring Platform 610. This interface is the source of data and commands local to the Communication Platform and coming from the Detection and Monitoring Platform. It is also the destination local to the Communication Platform for data going to the Detection and Monitoring Platform.

This embodiment also contains a Control Program Generation & Execution Platform interface 793 employing logic to manage the cooperative exchange of data with the Control Platform 650. This interface is the source of data local to the Communication Platform and coming from the Control Program Generation & Execution Platform. It is also the destination local to the Communication Platform for data and commands going to the Control Program Generation & Execution Platform.

This embodiment also contains an Off-Board Programming Platform interface 794 employing logic to manage the cooperative exchange of data with the Off-Board Programming (Update Generation) Platform 750. This interface is the source of data local to the Communication Platform and coming from the Off-Board Programming (Update Generation) Platform 750. It is also the destination local to the Communication Platform for data and commands going to the Off-Board Programming (Update Generation) Platform 750.

This embodiment also contains local Memory 712 used to temporarily store data and calculated values used within the Communication Platform such as Data Buffer Memory 714, Communications Configuration Data 713, and Communications Metadata 715.

Within the Off-Board Programming (Update Generation) Platform 750 are found code generator 750 and code packager logic 751 for creating control programming and generating resultant flash programming files. Also is provided a user interface platform interface 756 communicatively coupling off-board programming (update generation) platform 750 and user interface platform 730, as well as a communication platform interface 761 communicatively coupling off-board programming (update generation) platform 750 communication platform 710. Further provided is a local memory 752 including memory for flash target 759, flash metadata 755 and flash configuration data 753.

Figure 8:
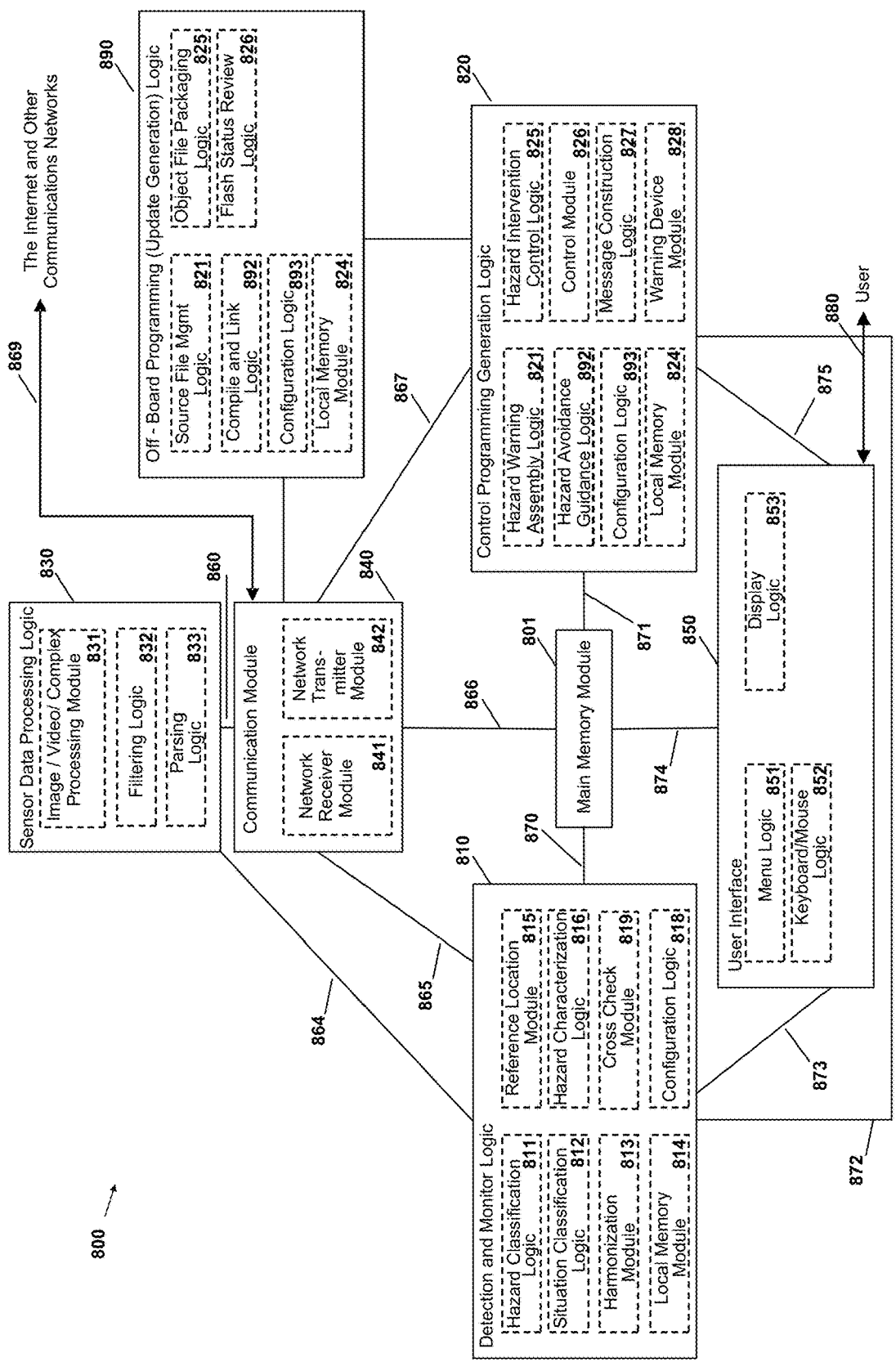
FIG. 8 illustrates a block diagram of sample control logic for the platform of FIGS. 6 and 7.

FIG. 8—Characteristics of an example Software Architecture for a disclosed Host-and-Master device (e.g., host-and-master 201 of FIG. 2, supra). FIG. 8 depicts the example software architecture 800 running on the hardware seen in FIGS. 6 and 7, and used to implement the functionality of disclosed embodiments.

FIG. 8 illustrates example software architecture 800 for various embodiments of the present disclosure, with a common communications and execution architecture to execute the tasks required to perform its functionality, the functionality to be employed in the configuration, management, and update of controllers providing autonomous operation of conveyances under the system. It consists of a Main Memory Module 801, Detection and Monitor Logic 810, Control Programming Generation Logic Within the Sensing Data Processing Logic 830 are one module and logic for the processing of incoming signals and data forwarded from controllers in the field. Filtering Logic 832 is present for the purpose of excluding or removing noise and unwanted information from all incoming signals and data streams.

Parsing Logic 833 is also present, this for the purpose of extracting encoded sensor data from the protocol information surrounding it and added to it in order to support transmission over the General Network or by other encoded means.

This embodiment also has present an Image and Video Complex Processing Module 831 for the purpose of extracting information about objects, obstacles, items to be protected, hazards, and potential hazards from images, still and moving, including those taken in the visible light, infrared or ultraviolet spectra, or similar data taken using radar, lidar, sonar or other similar means and sent over the network by the controller.

This embodiment also has present the means that allow the transfer of data to and from the Detection and Monitor Logic 810, including transfer of commands from the Detection and Monitor Logic that govern data acquisition and transfer of data to the Detection and Monitor Logic in return 864, and the Communications Module 840, including but not limited to incoming sensor data received 860 from the General Network 869, or other networks or means.

Within the Detection and Monitor Logic 810 is found logic that conducts and controls monitoring of objects, obstacles, hazards and potential hazards, executing four major functions. It also includes modules, also providing four major functions. A Reference Location Module 815 is present for the purposes of establishing the precise geographic location of the conveyance.

Also within the embodiment is Hazard Characterization Logic 816, which processes data about objects, obstacles, hazards and potential hazards in order determine where they are, if they are moving, in which direction they are moving if they are, and the type of object, obstacle or hazard that they represent. Additional logic, labeled Hazard Classification Logic 811, is present, unique to this invention, to determine the Safety Criticality Level (SCL) of each hazard and potential hazard, for use in determining whether a hazard is already in the existing safety analysis, or has previously been unseen.

Also within the embodiment is a Harmonization Module 813, which is present for the purpose of comparing similar or same information from multiple sources in order to determine the most precise estimate of the actual measurement from which the data has come. One example of harmonization is the comparison of hazard characterization data from identical hazards, but as seen by different controllers in the field in order to arrive at the most accurate estimate of the true nature of the hazard. Since both have some inherent error in their estimates melding the two together in the harmonization process results in reduction of the total error below that of either one individually.

Also within the embodiment is a Cross Check Module 819 which compares similar or same information from multiple sources as well, however unlike the Harmonization Module this module conducts its comparison in order to determine if a harmonized version can be created when there is a significant difference in the data provided by them. It is also present to weed out spoofed (purposely inaccurate data) that may be generated by sources that cannot be confirmed as trustworthy.

Also found within this embodiment is a Local Memory Module 814, which handles storage of interim values during the execution of the functionality within the Detection and Monitor Logic, and Configuration Logic 818, which is used to set up the Detection and Monitor Logic prior to use.

Within the Control Programming Generation Logic 820 is found functionality that assembles and issues updated programming for dissemination to controllers in the field, and those being prepared to go into the field, taking into consideration the observed characteristics of events and situations, and hazards and potential hazards. Novel to the disclosed embodiments, Control Programming Generation Logic 820 is provided with data carrying this 872 from the Detection and Monitoring Logic 810, such as SCL ordered by hazard, this data providing a clear indication of the situation in order to determine if update of programming for controllers is necessary.

Also within this embodiment is Hazard Avoidance and Mitigation Guidance Logic 892, which is used to generate a specific plan of action to mitigate all hazards that present a danger. One course of action that can be taken in mitigation is to direct (steer) the conveyance user out of harm's way by providing instructions for movement transit to the nearest safer location, i.e. to a geographically-nearby safe state. This is supported by Message Construction Logic 827 that assembles such messages, directions, and instructions in proper formats to be understood upon receipt by the controllers, the host-and-master, or if by reading by humans through text, audio or graphical display output.

A third is to provide a simple warning with its implications understood inherently, or conveyed in training the controller at first use. The Control Programming Generation Logic contains a Warning Device Module 828 that feeds this kind of warning to the controller within its programming or real-time over the network if in co-processing mode.

Also within at least one embodiment can be found a Control Module 826 and Hazard Intervention Control Logic 825, which constructs and embeds in the controller programming to mitigate hazards by transitioning to a safe state. This command can also be sent out over the General Network 869, with the assistance of the Communication Module 840, to the conveyance if in co-processing mode, via data transmitted to it 867.

Also found within this embodiment is a Local Memory Module 824, which handles storage of interim values during the execution of the functionality within the Warning Logic, and Configuration Logic 823, which is used to set up the Warning Logic prior to use.

The Control Programming Generation Control Module and the Detection and Monitor Module frequently exchange data 872 in the course of the execution of the functionality found within the two.

Within the Communication Module 840 are receiver and transmitter modules. Within this embodiment a Network Receiver Module 841 is provided to process commands, messages and data received over the General Network. Also provided is a Network Transmitter Module 842, this for the purpose of processing commands, messages and data that is to be transmitted over the General Network. These modules are capable of handling receiving and transmitting over all communication variants defined under the concept of the General Network described herein, including all forms of Ethernet (IEEE 802.11x), all forms of Bluetooth, all Cellular Network protocols, and will be expected to handle any other new and related network communications concepts that are forthcoming. The Communication Module sends data to and receives data 864 from the Detection and Monitor Logic 810, sends data to and receives data 860 from the Sensor Data Processing Logic 830, and sends data to and receives data 867 from the Control Programming Generation 820 Logic during the execution of the functionality found within the three.

The means to generate and initiate transfer of remote flash programming is present 890 to feed controllers with updates, and used to update them quickly when in the field so as to reduce safety risk by fielding new hazard mitigations as quickly as possible after they are determined to be needed.

Within the User Interface 850 is placed the functionality necessary to allow the user to receive, identify, and log perceived hazards or unsafe behavior they see uncover in their use of the Host-and-master application, and involving the conveyance, especially if it seems that the autonomous controller does not appear to be recognizing or mitigating them.

Found in this embodiment is Menu Logic 851 for presenting options to the User 880, Keyboard and Touchscreen and Mouse Logic 852 for accepting inputs from the user in response, Display Logic 853 for presenting menus and maps for consideration by the user, and an Interactive Map I/O Module 854 for displaying geographical coordinates, locations, or features. The user interface communicates locally 877 with the Detection and Monitor Logic and also communicates locally 875 with the Control Programming Generation Logic during the execution of the functionality found within the three.

Within the Main Memory Module 801, is found memory that can be shared among some or all Logic units and the Communication module, transmitted and received locally to or from 870 the Detection and Monitor Logic, to or from 866 the Communication Module, to or from 871 the Control Programming Generation Logic, and to or from 874 the User Interface. This memory handles storage of interim values and values to be transmitted or received within the Host-and-Master during the execution of the functionality within it.

Figure 9:
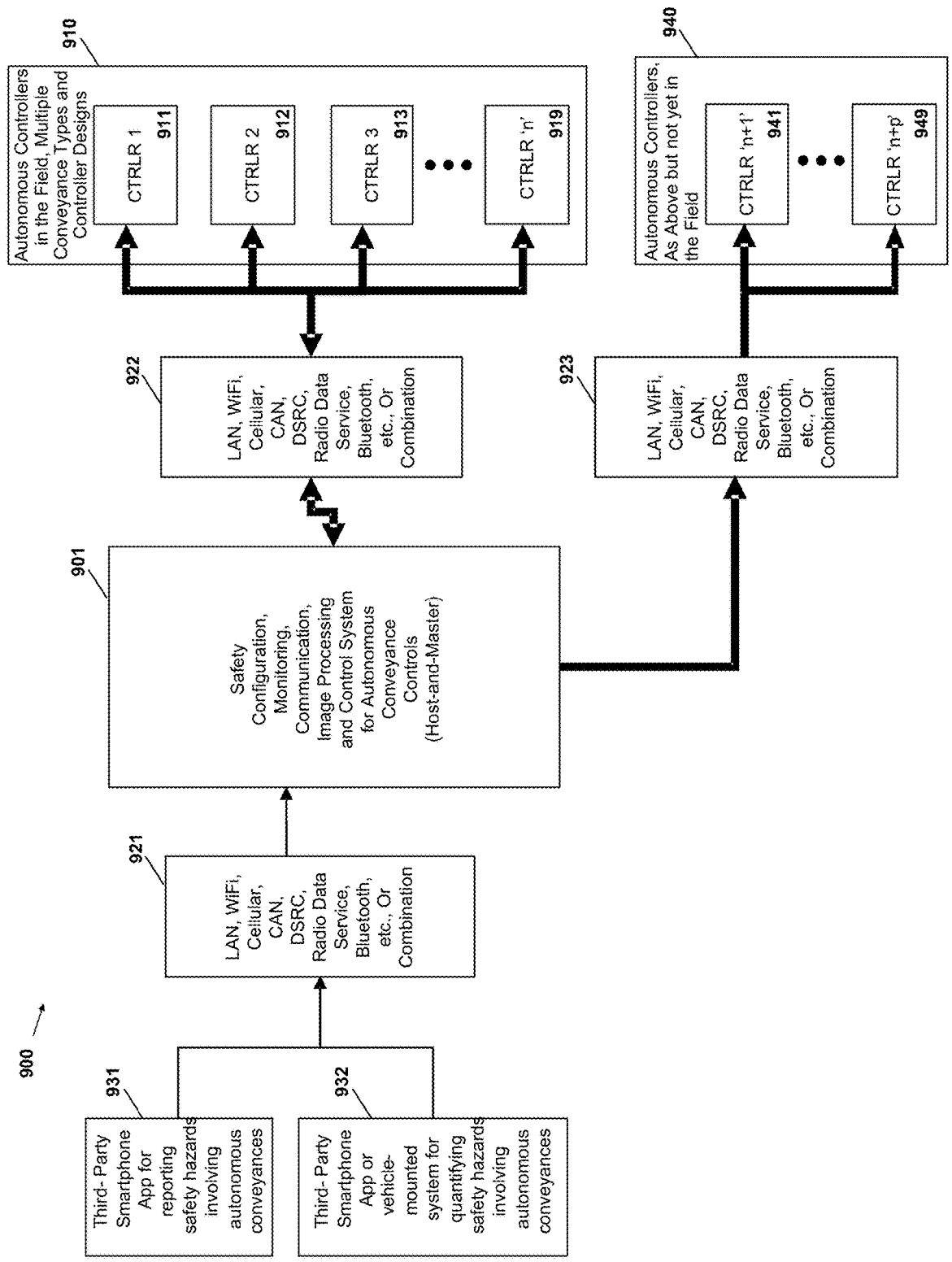
FIG. 9 depicts a block diagram of an example networked controller architecture integrating field-deployed autonomous conveyances with non field-deployed conveyances.

FIG. 9 illustrates the general case of the situation seen in FIG. 2. It depicts the management of controllers, by various embodiments of the present disclosure, but used in a multitude of possible conveyances 910, and 940, rather than those that are exclusively automobiles.

Implicit is the case where the set of conveyances making up 910 and 940 consists of controllers that are identical in construction and programming, and deployed in conveyances which themselves are identical, i.e. all railway locomotives of the same type and class, or all ships of the same type and class. Lessons learned by one member of this set are easily extensible to the other members, and all the other conveyances of the same type and class, whether in the field, or not yet there, precisely because they are identical.

Unique however is the case where lessons learned are carried to differing controllers and/or different conveyances, concentrating on similarities in events, situations and hazards encountered, starting with similarities in objects and obstacles, rather than similarities between conveyances.

It is highly likely that sets of controllers developed to support differing kinds of conveyances can experience the same or similar events, situations and thus hazards, because they all have identical basic goals. These being that each, of and on its own and without a human operator running the conveyance, successfully carries its cargo or passengers, navigating complex previously established paths, from a start point to an end, avoiding objects obstacles that must not be collided with or harmed in any way, and obeying traffic laws. Also that they are intended to operate in environments containing, and in doing so closely interacting with, humans, pets, other animals, and expensive infrastructure, vehicles or equipment, all of which must not be harmed as these conveyances travel along their intended path from start to finish.

The subject matter described herein, in one or more embodiments, generates programming from lessons learned by differing autonomous controllers, by extending the means to meet those safety goals in response to previously unforeseen hazards arising from unforeseen events and situations.

In example embodiments of the subject matter described herein input is taken, from passengers being carried by the conveyance upon which they are reporting, for the purposes of highlighting safety-critical events encountered in daily usage, whether common, rare, or infrequent, whether handled well by the autonomous controller or not, for subsequent processing into updated programming for autonomous controllers. Updates are specifically constructed to add to or improve mitigation of hazards, those previously unforeseen, as well as those already understood and for which mitigation methods are already present.

Figure 10:
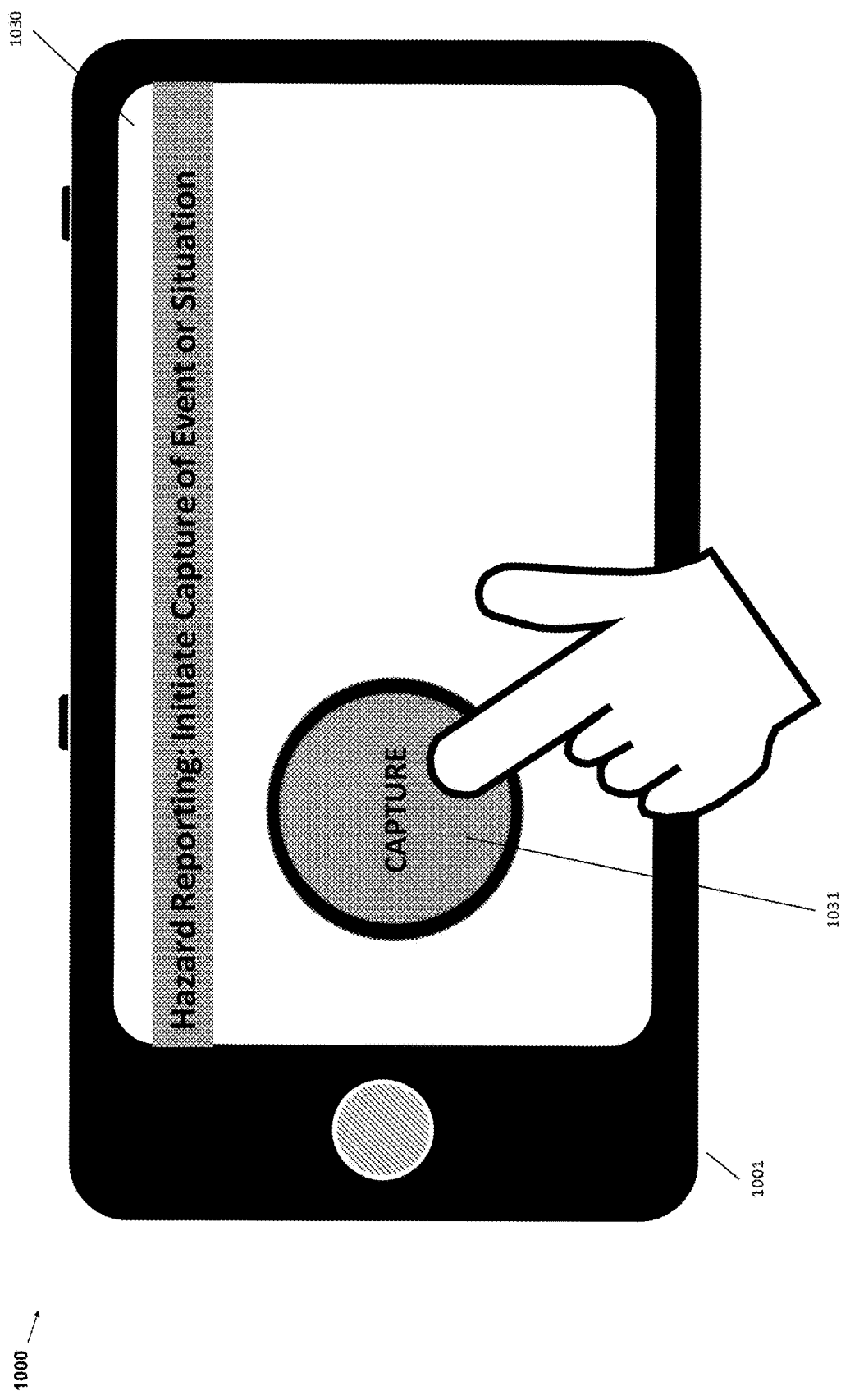
FIGS. 10 and 10A illustrate example user interfaces for hazard reporting applications, in further embodiments.
Figure 10A:
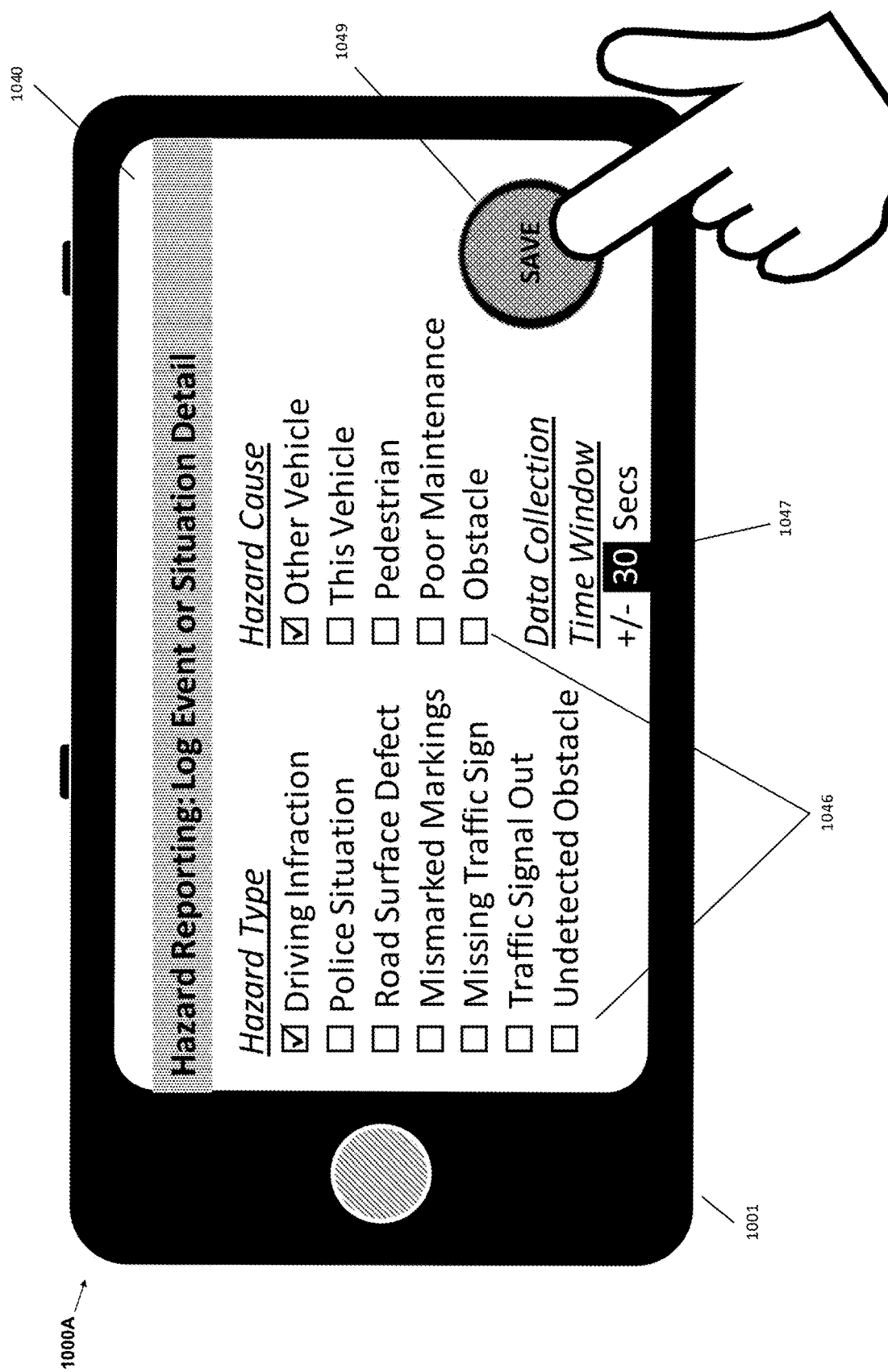

FIGS. 10A and 10B illustrate example user interfaces employed to record the occurrence of situations, events or hazards that are deemed to be unsafe when encountered by its user as a passenger on the conveyance, or an observer watching it interact with its surroundings as is operates. The embodiment captured in these two figures is pictured as being hosted on a smartphone 1001, but also could be on another portable device such as a tablet, smartwatch, or laptop PC, or on a dedicated user input device installed within, or outside, the conveyance.

It takes input from passengers being carried by the conveyance upon which they are reporting, or from nearby observers watching the behavior of the autonomous conveyance as it operates. This data is captured and relayed upon selection by the user of a capture request 1031. Next the user provides detail about the situation, event or hazard 1036, and specifies a time window 1037. The time window sets time boundaries, one before (−) and one after (+) the point in time at which the capture request was initiated, for the purpose of defining a specific subset of sensor data taken by the controller during its operation before, during and after that time period. Data from 1031, 1036 and 1037, as well as the block of sensor data, are forwarded to the host-and-master over the network for analysis and hazard elicitation.

The app is more versatile however, for another embodiment is configured to record input in the form of data taken on, and from the perspective of, non-autonomous vehicles. These data and details about the situation, event or hazard which generated them is forwarded by their users for the purposes of highlighting safety-critical events encountered in daily usage, regardless of whether or not they involve autonomous control, for safety critical events, situations and hazards that could impact the safety of passengers within, or pedestrians nearby, a conveyance are not specific to the nature of that conveyance, whether autonomous or traditional.

This too is for the purposes of highlighting safety-critical events encountered in daily usage, whether common, infrequent or rare, whether handled well by an autonomous controller, or traditional driver or operator, or not, for processing into updated programming for autonomous controllers, and perhaps for the development of enhanced operator training for traditional drivers or operators.

Integration of this smartphone solution with the conveyance, especially automobiles and trucks, can be by way of example via Apple CarPlay or Android Auto for a seamless interface to a driver, operator or passenger, or other suitable applications, communication platforms and the like.

Generally, the illustrated embodiments disclosed herein are not provided as strict limitations on how the disclosed aspects can be practiced by one of ordinary skill in the art, but are intended to be provided as examples that can be modified, interchanged, added to or subtracted from as would be suitable to one of ordinary skill in the art. As an example, an arrangement of components depicted in one embodiment can be swapped with components depicted in another embodiment, optionally excluding some components or including other components illustrated in a third embodiment, according to design creativity of one of ordinary skill in the art. For instance, autonomous controller 101 and conveyance 150 of FIG. 1 can be incorporated within FIG. 2 as communicatively connected with host-and-master 201 by way of network interface(s) 130, as suitable. As a further example, components of disclosed devices can be implemented as external to and communicatively or operably connected to other components of a parent device, rather than included within the parent device. For instance, one or more of sensing, detection and tracking devices 210 can be external to conveyance 150 and autonomous controller 101 and communicatively connected thereto instead of implemented as a component thereof. Alternatively, the opposite orientation can be implemented within the scope of the disclosure: one component (e.g., control platform 350) depicted separate from another component (e.g., detection and monitoring platform 310) can be aggregated as a single component in some embodiments, providing aggregate functionality. Embodiments or portions thereof depicted in one Figure can be exchanged with or incorporated with embodiments depicted in other Figures; embodiments or portions thereof in the one Figure can be combined with the other Figure(s), and the like as would be suitable to one of ordinary skill in the art, or reasonably conveyed to one of ordinary skill in the art by way of the context provided herein. Additionally, it is noted that one or more disclosed processes can be combined into a single process providing aggregate functionality. Still further, components of disclosed modules/stored logic/sensors/control units can also interact with one or more other components not specifically described herein but known by those of skill in the art to provide aggregate, supplemental or additional functionality, as suitable.

Description of Example Flow Diagrams

In view of the exemplary diagrams described herein, process methods that can be implemented in accordance with the disclosed subject matter will be better appreciated with reference to the flowchart of FIGS. 11-18B. While for purposes of simplicity of explanation the methods of FIGS. 11-18B are shown and described as a series of blocks, it is to be understood and appreciated that the scope of the disclosure and the claimed subject matter is not limited by the order of the blocks, as some blocks can occur in different orders or concurrently with other blocks from what is depicted and described herein. Moreover, not all illustrated blocks are necessarily required to implement the methods described herein. Additionally, it should be further appreciated that some or all the methods disclosed throughout this specification are capable of being stored on an article of manufacture to facilitate transporting and transferring such methods to an electronic device. The term article of manufacture, where utilized, is intended to encompass a computer program accessible from any computer-readable device, device in conjunction with a carrier, or storage medium.

Figure 11:
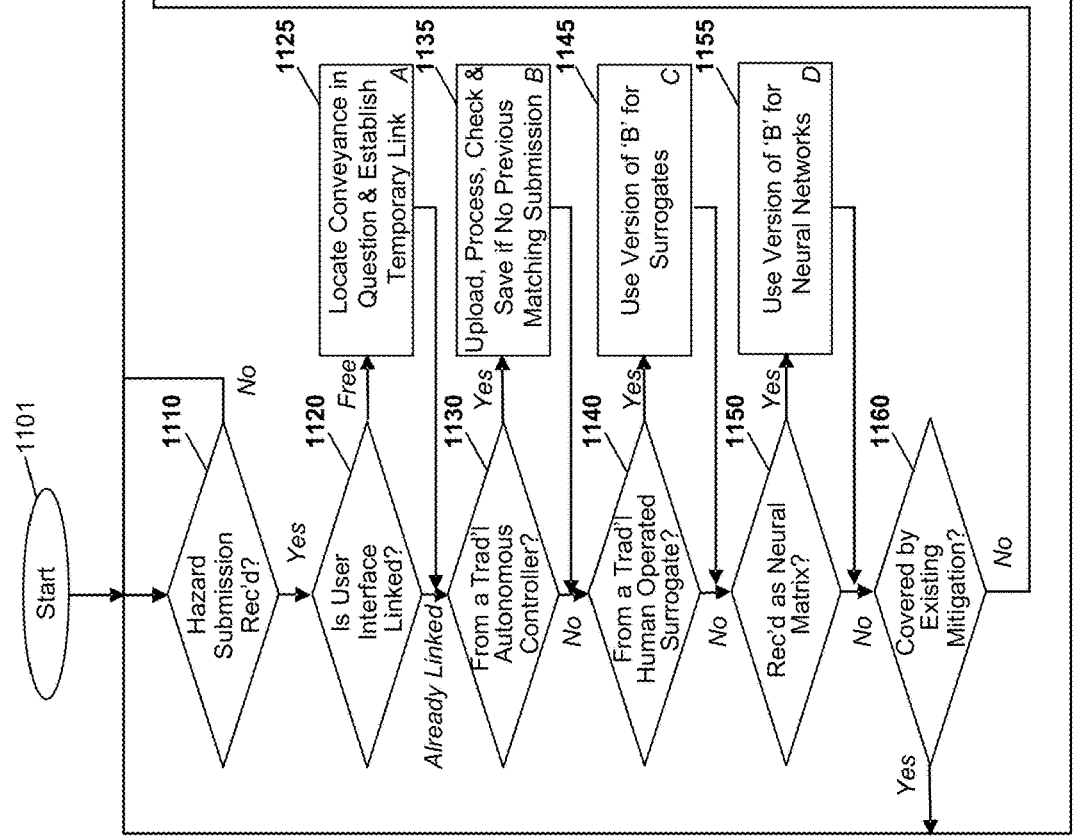
FIG. 11 illustrates a flowchart of a sample method for a control logic operating on a hazard identification and control generation platform described herein.

FIG. 11 illustrates a flow chart of an example method 1100 for management of controllers of autonomous conveyances, according to one or more further embodiments. As one example, method 1100 can be executed to implement the functionality of the Host- and-Master device (e.g., see FIGS. 6, 7 and 8, infra). In one or more embodiments, method 1100 can be a primary code routine executed on a host-and-master device from which subsequent methods pertaining to locating a conveyance (e.g., method 1200, infra), evaluating a hazard(s) from an autonomous controller (e.g., method 1300, infra), evaluating a hazard from a controller or human-operated surrogate (e.g., method 1300A, infra), evaluating a hazard from a neural network controller or surrogate (e.g., method 1300B, infra), creating a new mitigation(s) for a newly identified hazard(s) (e.g., method 1400, infra), establishing a co-processing mode (e.g., method 1500, infra), generating, transmitting and confirming a Flash controller(s) update (e.g., method 1600, infra), generating, transmitting and confirming a Flash controller(s) update and initiating co-processing mode (e.g., method 1700, infra), submitting a hazard report in response to a third-party hazard identification (e.g., method 1800, infra), submitting a hazard report in response to a dedicated surrogate hazard identification (e.g., method 1800A, infra), or submitting a hazard report in response to a temporary surrogate hazard identification (e.g., method 1800B, infra), or the like, or a suitable combination of the foregoing, can be executed as established by method 1100.

At 1101 method 1100 can begin and proceed to 1110, where method 1100 can comprise determining whether a hazard submission is received, for example, from an autonomous conveyance controller interface, from a third-party application or platform interface, or the like. If no hazard submission is received, method 1100 can return to reference number 1110.

At 1120, method 1100 can comprise determining whether a communication link with a user interface associated with the hazard submission is established, in response to receiving the hazard submission. If no user interface link is established, method 1100 can proceed to 1125 and location a conveyance associated with the hazard submission and establish a temporary link with a user interface thereof. From 1125, method 1100 can proceed to FIG. 12 at Ai.

At 1130, method 1100 can comprise determining whether a user interface link is established with a non-neural networked controller of an autonomous conveyance in response to determining the link is established at reference number 1120. In response to determining the user interface link is with the non-neural networked controller of the autonomous conveyance, method 1100 can proceed to 1135 can comprise uploading, processing, checking and saving the hazard submission if no previous matching hazard submission is saved. From reference number 1135, method 1100 can proceed to FIG. 13 at Bi.

At 1140, in response to determining that the user interface link is not established with the non-neural networked controller, method 1100 can determine whether the user interface link is established with a human-operated surrogate platform. If so, method 1100 can proceed to reference number 1145 and initiate method 1300A of FIG. 13A, infra.

At 1150, in response to determining that the user interface link is not established with the human-operated surrogate platform, method 1100 can determine whether the user interface link is received as part of a neural matrix. If so, method 1100 can proceed to 1155 and initiate method 1300B of FIG. 13B, infra.

At 1160, in response to determining that the user interface link is not received as part of the neural matrix, method 1100 can determine whether the hazard submission is addressed by an existing mitigation or avoidance algorithm previously updated by a network control and management system to controllers of autonomous conveyances. If yes, method 1100 can return to reference number 1110. Otherwise, method 1100 can proceed to 1170 and can comprise creating a new mitigation for the hazard submission. As an example, method 1100 can execute method 1400 of FIG. 14, infra, to implement creating the new mitigation for new hazard submission. At 1172, method 1100 can comprise determining whether existing hardware of an autonomous conveyance or class of autonomous conveyances targeted for the new mitigation is suitable for the new mitigation. If so, method 1100 can proceed to reference number 1183. Otherwise, method 1100 proceeds to 1174 and determines whether the hazard submission is an urgent, high-risk hazard. If the hazard is not an urgent, high-risk hazard method 1100 can proceed to 1183, and can determine whether the target conveyance/class of conveyances is ready to be Flashed for the new mitigation. If not, method 1100 can return to reference number 1183; otherwise, method 1100 proceeds to 1185 and flashes the update to the target conveyance/class of conveyances and returns to reference number 1110. As an example, method 1100 can execute method 1600 of FIG. 16, infra, to implement flashing the update to the target conveyance/class of conveyances.

From reference number 1174, in response to determining the hazard submission is an urgent, high-risk hazard, method 1100 can proceed to 1180 and setup a remote co-processing mode. For instance, method 1100 can execute method 1500 of FIG. 15, infra, to set the remote co-processing mode. At 1190, method 1100 can comprise flashing the update and activating the remote co-processing mode. From 1190, method 1100 can return to reference number 1110. For instance, method 1100 can execute method 1700 of FIG. 17, infra, to flash the update and activate the remote co-processing mode.

Figure 12:
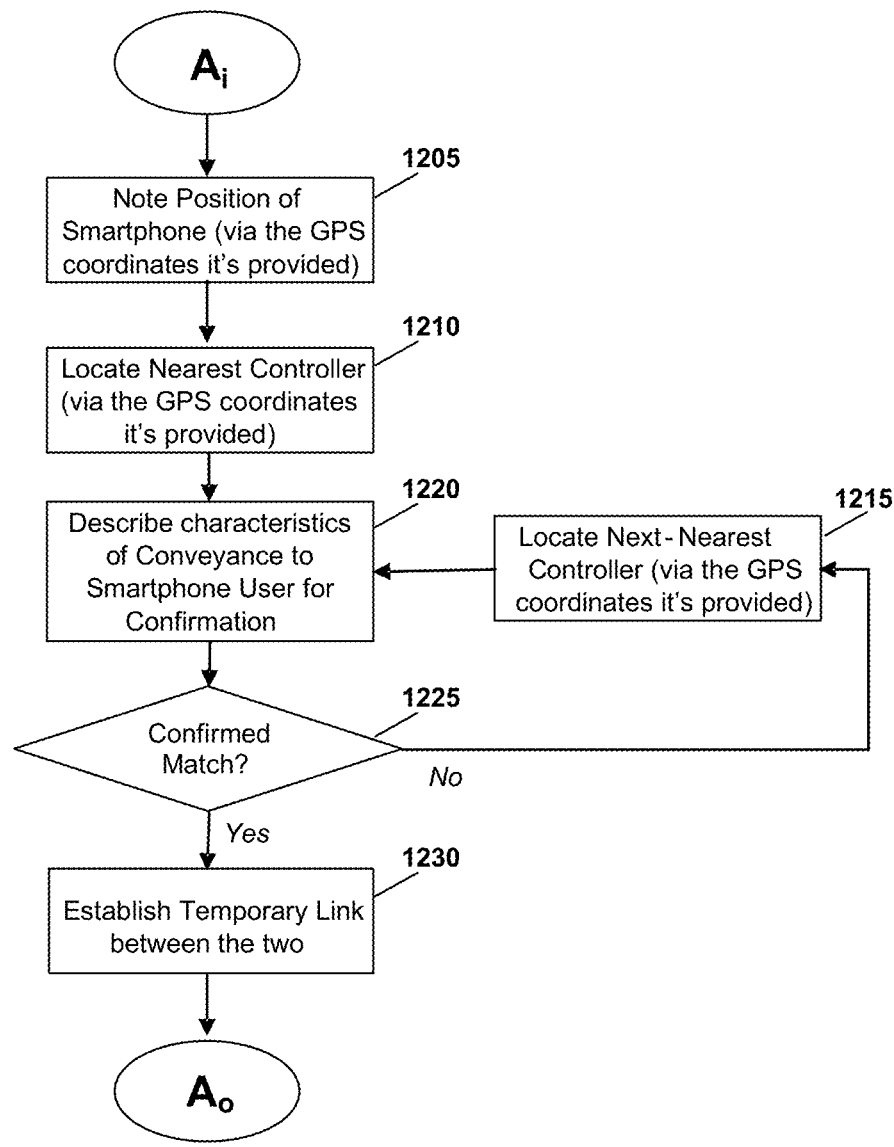
FIG. 12 depicts a flowchart of an example method for connecting a hazard reporting device to an autonomous conveyance according to disclosed embodiments.

FIG. 12 illustrates a flow chart of an example method 1200 of another embodiment of the present disclosure. For instance, method 1200 can be configures to locate a conveyance associated with a hazard report and link a previously-unlinked hazard reporting interface device (e.g., a smartphone, tablet, smartwatch, etc.) running a suitable user interface application, being operated by a passenger (inside), or a first-responder or passerby (outside) a conveyance, one-on-one with the conveyance's controller. The link can be temporary and serve to ensure that reporting being submitted by the user is correctly attributed to the correct conveyance for one event, situation or hazard. After reporting is completed this link can be broken, and the user is free to link with another conveyance controller at some later point to report an additional event(s), situation(s) or hazard(s).

Another type of link exists as well. Not pictured here, it is established one-on-one between a hazard reporting interface device (e.g., smartphone, tablet, smartwatch, etc.) and controller at the time of deployment, and is dedicated to that controller. In other words, it is a dedicated connection between phone, user interface or dedicated user interface device and controller used for long-duration pairing, for development purposes for instance.

Beginning at reference number 1205, method 1200 can comprise acquiring and saving a position of a hazard reporting device (e.g., via GPS coordinates or other location identifying data) received with a hazard report. At 1210, method 1200 can comprise locating a nearest autonomous controller to the position of the hazard reporting device and, at 1220, provide characteristic data descriptive of a conveyance associated with the nearest autonomous controller and a request to confirm a description match between the hazard report and the conveyance described by the characteristic data. At 1220, method 1200 can determine whether a description match is received in response to providing the characteristic data. If no, method 1200 can proceed to 1215 and locate a next-nearest autonomous controller to the position of the hazard reporting device and, at reference 1220, provide second characteristic data descriptive of a second conveyance associated with the next-nearest autonomous controller.

In response to determining at 1220 that a description match is received, method 1200 proceeds to 1230. At 1230, method 1200 can comprise establishing a temporary link between the controller of the conveyance matching the characteristic data and the hazard reporting device. The temporary link can enable hazard reporting from the hazard reporting device that is linked with sensor and imaging data, conveyance data, and the like associated with the conveyance and the controller of the conveyance.

Figure 13:
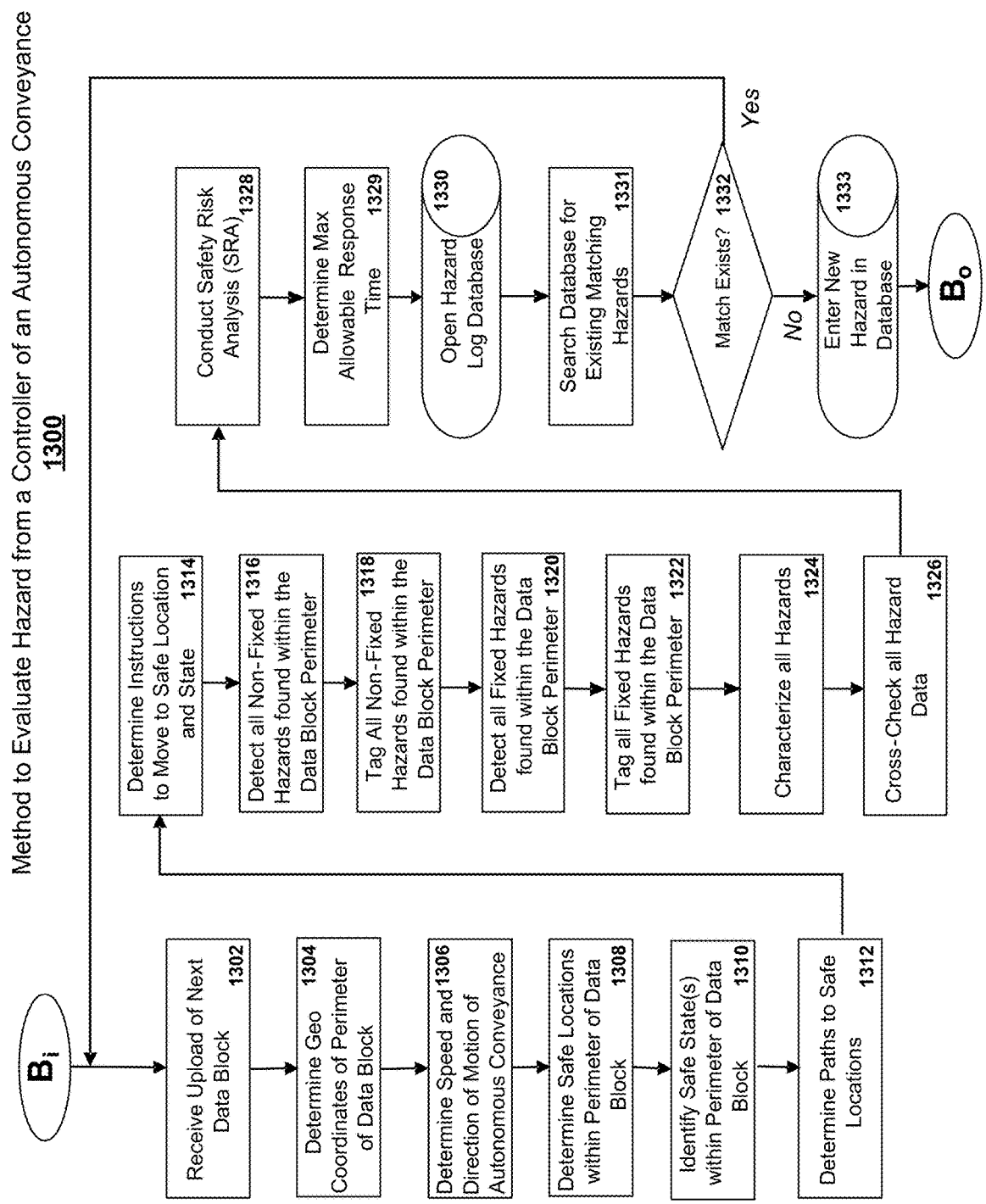
FIGS. 13, 13A and 13B illustrate flowcharts of respective example methods for evaluating a hazard from different hazard reporting devices, in yet additional embodiments.

FIG. 13 illustrates a flow chart of an example method 1300 of an embodiment(s) disclosed herein that receives a request for service, and processes the request, from a hazard reporting device (e.g., smartphone, tablet, computer, smartwatch, etc.) or dedicated user interface device whose user intends to report an event, situation or hazard involving a conveyance controlled by an independent (e.g., non-neural network) autonomous controller.

At 1302, method 1300 can comprise receiving an upload of a next data block. At 1304, method 1300 can comprise receiving geographic coordinates or other position location data of a perimeter of the data block. At 1306, method 1300 can comprise determining speed and direction of motion of the conveyance controlled by the independent autonomous controller. At 1308, method 1300 can comprise determining safe locations within the determined perimeter of the data block, and at 1310, method 1300 can comprise identifying a safe state(s) (e.g., location, conveyance operating parameter, physical conveyance characteristic, etc.) within the perimeter of the data block. At 1312, method 1300 can comprise determining suitable paths (e.g., paths complying with operating constraints defined by a database of hazards, or paths lowering an identified hazard level to a lower hazard level of the database of hazards, or the like, or a suitable combination thereof) to the safe state(s) within the perimeter of the data block.

At 1314, method 1300 can comprise determining operating instructions associated with transitioning the conveyance to the safe state(s). At 1316, method 1300 can comprise determining any non-fixed hazards within the perimeter of the data block, and at 1318, tagging non-fixed hazards determined to be within the perimeter of the data block. At 1320, method 1300 can comprise detecting fixed hazards within the perimeter of the data block, and at 1322, tagging the fixed hazards detected within the perimeter of the data block.

At 1324, method 1300 can comprise characterizing all determined non-fixed hazards and fixed hazards within the perimeter of the data block, according to a stored database of hazards. Characterizing the hazards can comprise, for instance, analyzing sensor and imaging data for the conveyance in the perimeter of the data block, or sensor and imaging data of other conveyances within the perimeter of the data block, or perimeter characteristic data submitted within a hazard report of a third-party hazard reporting device associated with the perimeter of the data block, or data for the perimeter of the data block accessed from public or private network data sources (e.g., satellite data for the data block, public or private weather, environment, traffic, hazard reporting or other news database for the data block, and so forth). Once data pertinent to the data block is acquired and analyzed, the data can be compared with subsets of data respective to each hazard of the stored database of hazards to determine whether the data pertinent to the data block meets an identifying condition(s) associated with one or more hazards or classifications of hazards.

At 1326, method 1300 can comprise cross-checking all hazard data according to stored hazard characteristics associated with the characterized (fixed and non-fixed) hazards to corroborate the characterization of the hazards. Cross-checking the hazard data can further comprise determining whether multiple hazard data reports are consistent or have one or more inconsistencies contrary to the characterization of the hazards. Cross-checking the hazard data can further comprise identify any subset of hazard data or source of hazard data as being untrue data e.g. if the hazard data/source of hazard data is inconsistent with other hazard data/sources of data from the multiple hazard data reports, or whether a hazard reporting device identifier for a source of data cannot be digitally verified, or the like.

At 1328, method 1300 can comprise conducting a Safety Risk Analysis (SRA) for the determined hazards based on the characterization of the hazards or the cross-checking of hazard data, and at 1329, determining a max allowable response time. At 1330, method 1300 can comprise opening a hazard log database and, at 1331, method 1300 can comprise searching the hazard log database for existing matching hazards. At 1332, method 1300 can comprise determining whether a match exists between the characterized hazards and the existing hazards of the hazard log database. If a match exists, method 1300 can return to reference number 1302. If no match exists, method 1300 can proceed to 1333 and enter a new hazard(s) defined by the characterization of the hazard(s) into the hazard log database.

Figure 13A:
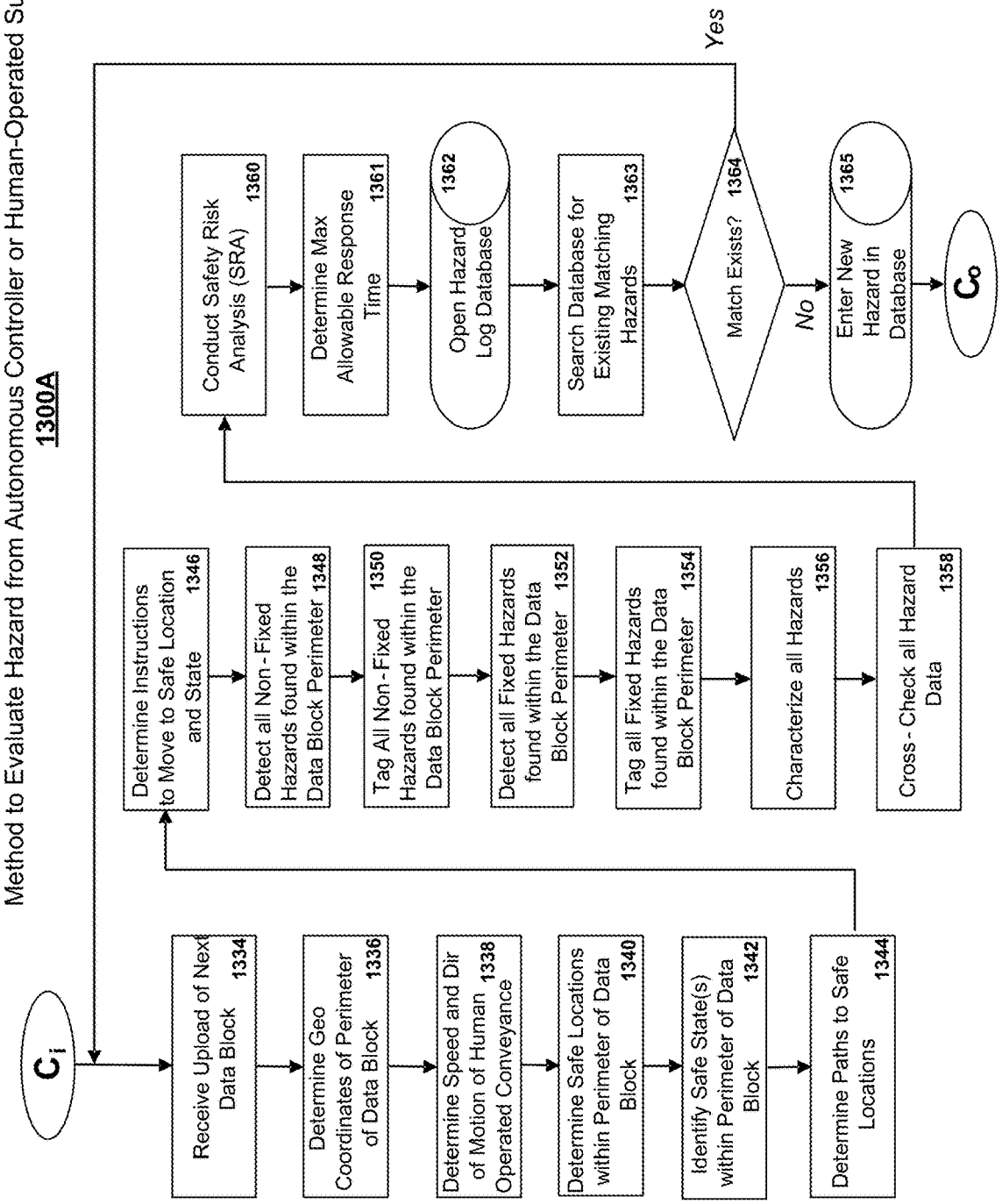

FIG. 13A illustrates a flow chart of a sample method 1300A that receives a request for service, and processes the request, from a hazard reporting device (e.g., computer, smartphone, tablet, smartwatch, etc.) or dedicated user interface device whose user intends to report an event, situation or hazard involving a conveyance controlled by an independent (non-neural network) surrogate autonomous controller, or human-operated surrogate. At 1334, method 1300A can comprise receiving an upload of a next data block. At 1336, method 1300A can comprise receiving geographic coordinates or other position location data of a perimeter of the data block. At 1338, method 1300A can comprise determining speed and direction of motion of the conveyance controlled by the independent controller or human-operated surrogate. At 1340, method 1300A can comprise determining safe locations within the determined perimeter of the data block, and at 1342, method 1300A can comprise identifying a safe state(s) (e.g., location, conveyance operating parameter, physical conveyance characteristic, etc.) within the perimeter of the data block. At 1344, method 1300A can comprise determining suitable paths to the safe state(s) (e.g., safe location; safe condition, etc.) within the perimeter of the data block.

At 1346, method 1300A can comprise determining operating instructions associated with transitioning the conveyance to the safe state(s) (e.g., moving the conveyance to a safe location, putting the conveyance physically, electronically or communicatively in a safe condition, or the like). At 1348, method 1300A can comprise determining any non-fixed hazards within the perimeter of the data block, and at 1350, tagging non-fixed hazards determined to be within the perimeter of the data block. At 1352, method 1300A can comprise detecting fixed hazards within the perimeter of the data block, and at 1354, tagging the fixed hazards detected within the perimeter of the data block.

At 1356, method 1300A can comprise characterizing all determined non-fixed hazards and fixed hazards within the perimeter of the data block, according to a stored database of hazards (e.g., see method 1300, supra, at 1324 for examples). At 1358, method 1300A can comprise cross-checking hazard data according to stored hazard characteristics associated with the characterized (fixed and non-fixed) hazards to corroborate the characterization of the hazards (e.g., see method 1300, supra, at 1326 for examples).

At 1360, method 1300A can comprise conducting a Safety Risk Analysis (SRA) for the determined hazards based on the characterization of the hazards or the cross-checking of hazard data, and at 1361, determining a max allowable response time. At 1362, method 1300A can comprise opening a hazard log database and, at 1363, method 1300A can comprise searching the hazard log database for existing matching hazards. At 1364, method 1300A can comprise determining whether a match exists between the characterized hazards and the existing hazards of the hazard log database. If a match exists, method 1300A can return to reference number 1302. If no match exists, method 1300A can proceed to 1365 and enter a new hazard(s) defined by the characterization of the hazard(s) into the hazard log database.

Figure 13B:
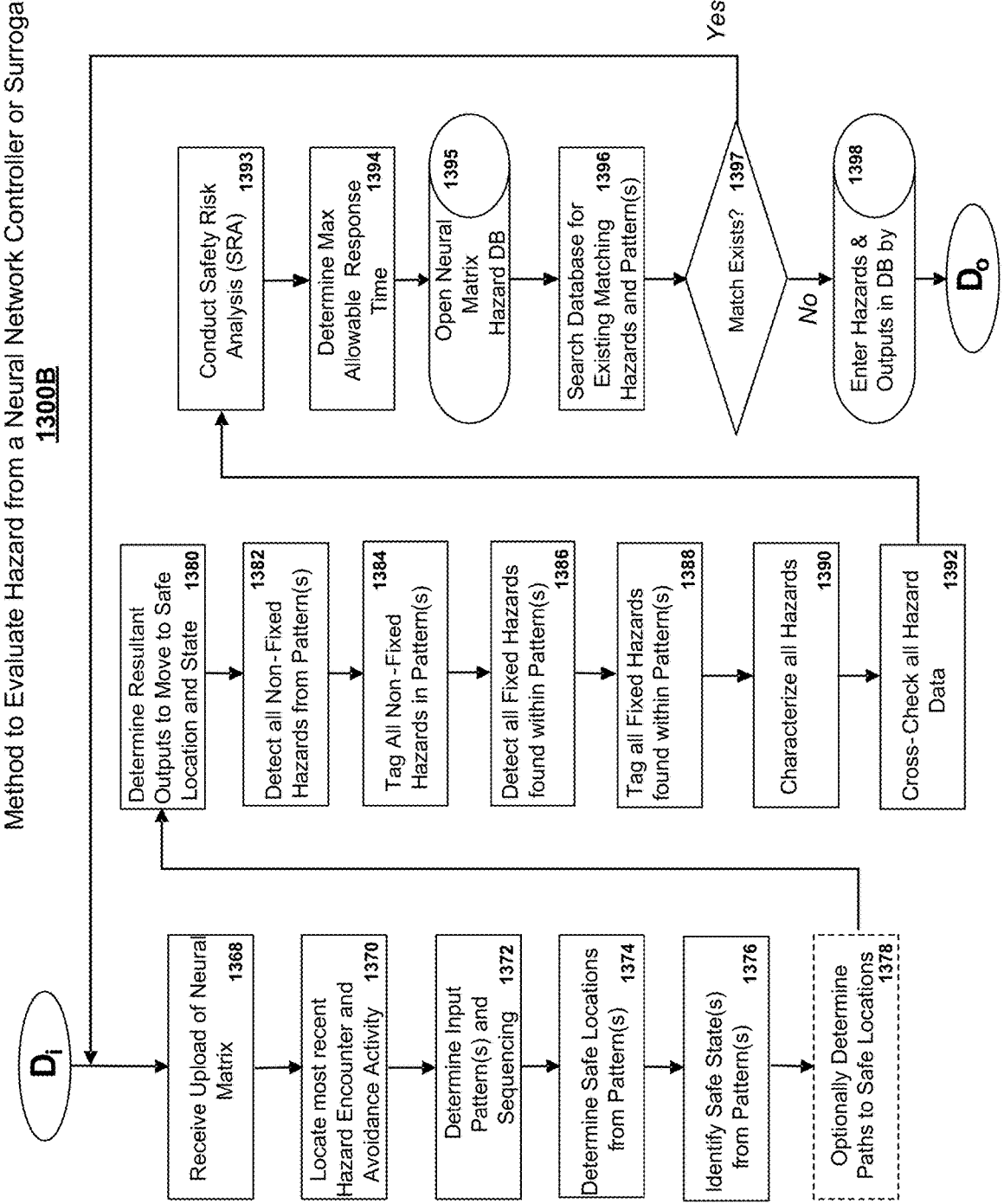

FIG. 13B illustrates a flow chart of an example method 1300B that receives a request for service, and processes the request, from a hazard reporting device (e.g., a computer, a smartphone, tablet, smartwatch, etc.) or dedicated user interface device whose user intends to report an event, situation or hazard involving a conveyance controlled by a neural network-based autonomous controller, or surrogate autonomous controller. At 1368, method 1300B can comprise receiving an upload of a neural matrix. At 1370, method 1300B can comprise locating a most recent hazard encounter and avoidance activity associated with the neural matrix. At 1372, method 1300B can comprise determining an input pattern(s) and sequencing, and at 1374, method 1300B can comprise determining safe locations from the input pattern(s). At 1376, method 1300B can comprise identifying a safe state(s) (e.g., location, conveyance operating parameter, physical conveyance characteristic, etc.) for the conveyance from the input pattern(s), and at 1378, method 1300B can optionally comprise determining suitable paths to the safe state(s) (e.g., safe location; safe condition, etc.).

At 1380, method 1300B can comprise determining resulting outputs to move to an identified safe state/safe location. At 1382, method 1300B can comprise determining any non-fixed hazards from the input pattern(s), and at 1384, tagging non-fixed hazards determined from the input pattern(s). At 1386, method 1300B can comprise detecting fixed hazards within the input pattern(s), and at 1388, tagging the fixed hazards detected within the input pattern(s).

At 1390, method 1300B can comprise characterizing all determined non-fixed hazards and fixed hazards, according to a stored database of hazards (e.g., see method 1300, supra, at 1324 for examples). At 1392, method 1300B can comprise cross-checking hazard data according to stored hazard characteristics associated with the characterized (fixed and non-fixed) hazards to corroborate the characterization of the hazards (e.g., see method 1300, supra, at 1326 for examples).

At 1393, method 1300B can comprise conducting a Safety Risk Analysis (SRA) for the determined hazards based on the characterization of the hazards or the cross-checking of hazard data, and at 1394, determining a max allowable response time. At 1395, method 1300B can comprise opening a neural matrix hazard database and, at 1396, method 1300B can comprise searching the neural matrix hazard database for existing matching hazards or input pattern(s). At 1397, method 1300B can comprise determining whether a match exists between the characterized hazards and the existing hazards of the neural matrix hazard database. If a match exists, method 1300B can return to reference number 1302. If no match exists, method 1300B can proceed to 1398 and enter a new hazard(s) defined by the characterization of the hazard(s) and associated outputs into the neural matrix hazard database.

Figure 14:
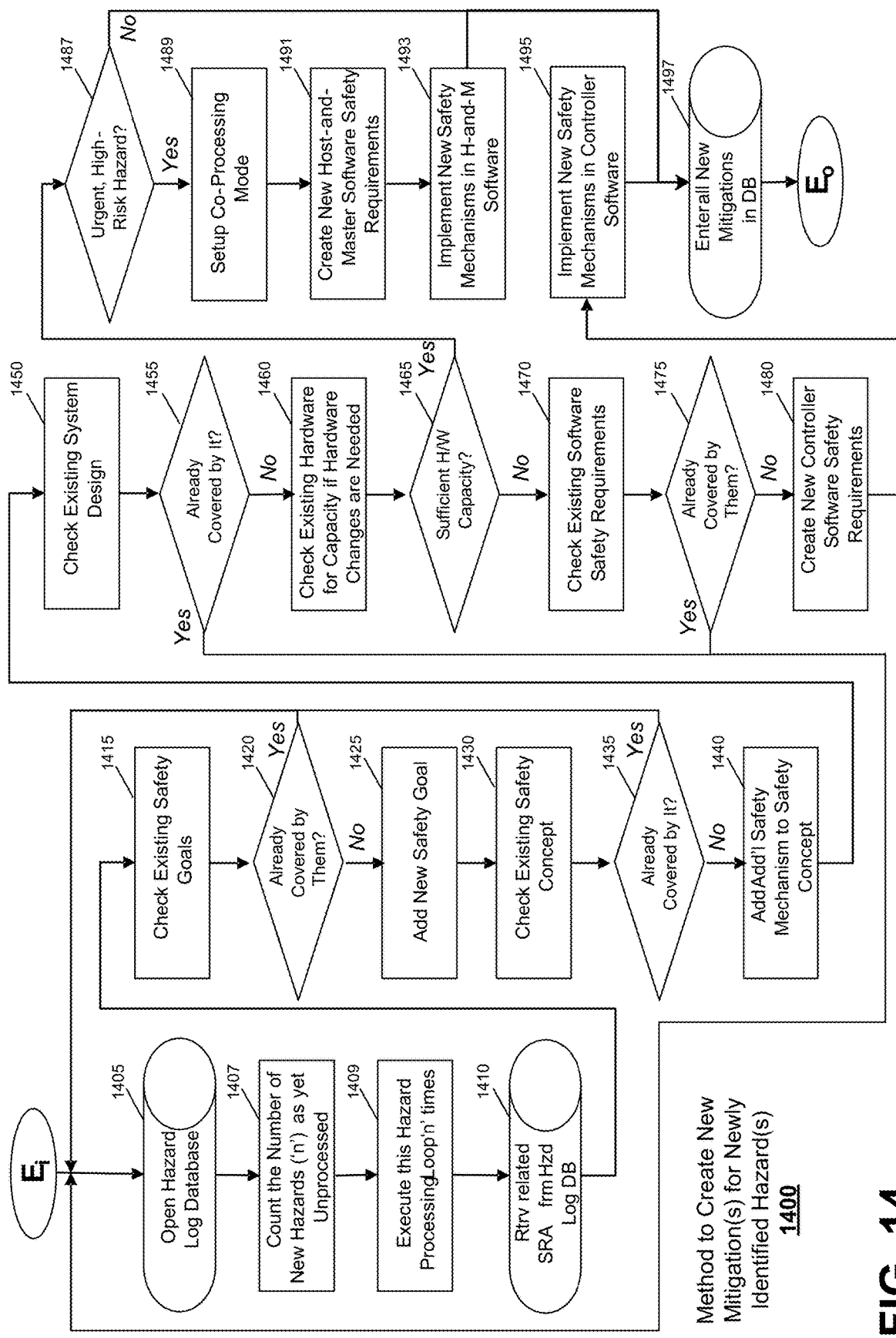
FIG. 14 illustrates a flowchart of a sample method for creating new mitigation programming for newly identified hazards, in a further embodiment.

FIG. 14 illustrates a flow chart of a sample method 1400 according to further embodiments of the present disclosure. In an example embodiment, method 1400 can be configured to process the evaluation of incoming reports, evaluate the need for new mitigations based on the data they relay, determine if an existing mitigation already mitigates the reported hazard, and create new mitigations for those hazards for which no existing mitigation will suffice.

Starting at 1405, method 1400 can comprise opening a hazard log database, and at 1407, counting a number of new hazards ('n', where n is zero or a positive integer) as yet unprocessed. At 1409, method 1400 can comprise executing a hazard processing loop provided by method 1400 'n' times.

At 1410, method 1400 can comprise retrieving related Safety Risk Analysis (SRA) information from the hazard log database and, at 1415, checking existing safety goals. At 1420, method 1400 can determine whether the existing safety goals provide suitable mitigation or avoidance procedures for the new hazards. If yes, method 1400 returns to reference number 1405; otherwise method 1400 proceeds to 1425 and can comprise adding a new safety goal. At 1430, method 1400 can comprise determining whether an existing safety concept(s) covers the new safety goal, and if so method 1100 can return to reference number 1405. If the new safety goal is not covered by the existing safety concept(s), method 1400 proceeds to 1440 and can comprise adding an additional safety mechanism to the existing safety concept(s). At 1450, method 1400 can comprise checking an existing system design and at 1455 determining whether the additional safety mechanism is already covered by the existing system design. If yes, method 1400 can return to reference number 1405; otherwise method 1400 can proceed to 1460 and can further comprise checking existing hardware for hardware capacity if hardware changes are indicated by the additional safety mechanism. At 1465, method 1400 can determine whether sufficient hardware capacity exists for the hardware changes. If sufficient hardware capacity exists, method 1400 proceeds to reference number 1487; otherwise method 1400 can proceed to reference number 1470.

At 1470, method 1400 can comprise checking existing software safety requirements and determining, at 1475, whether the additional safety mechanism is already covered by the existing software safety requirements. If yes, method 1400 can return to reference number 1405; otherwise method 1400 can proceed to 1480 and create a new controller software safety requirement(s), and proceed to reference number 1495, infra.

At 1487, in response to determining that sufficient hardware capacity exists at reference number 1465, method 1400 can determine whether an $n^{th}$ new hazard of the new hazards is an urgent, high-risk hazard. If yes, method 1400 can proceed to 1489; if no, method 1400 can proceed to 1497. At 1489, method 1400 can setup a co-processing mode, and at 1491, method 1400 can comprise creating a new host-and-master software safety requirement. At 1493, method 1400 can comprise implementing new safety mechanisms in host-and-master software. At 1497, method 1400 can comprise entering all new mitigations into a database.

Figure 15:
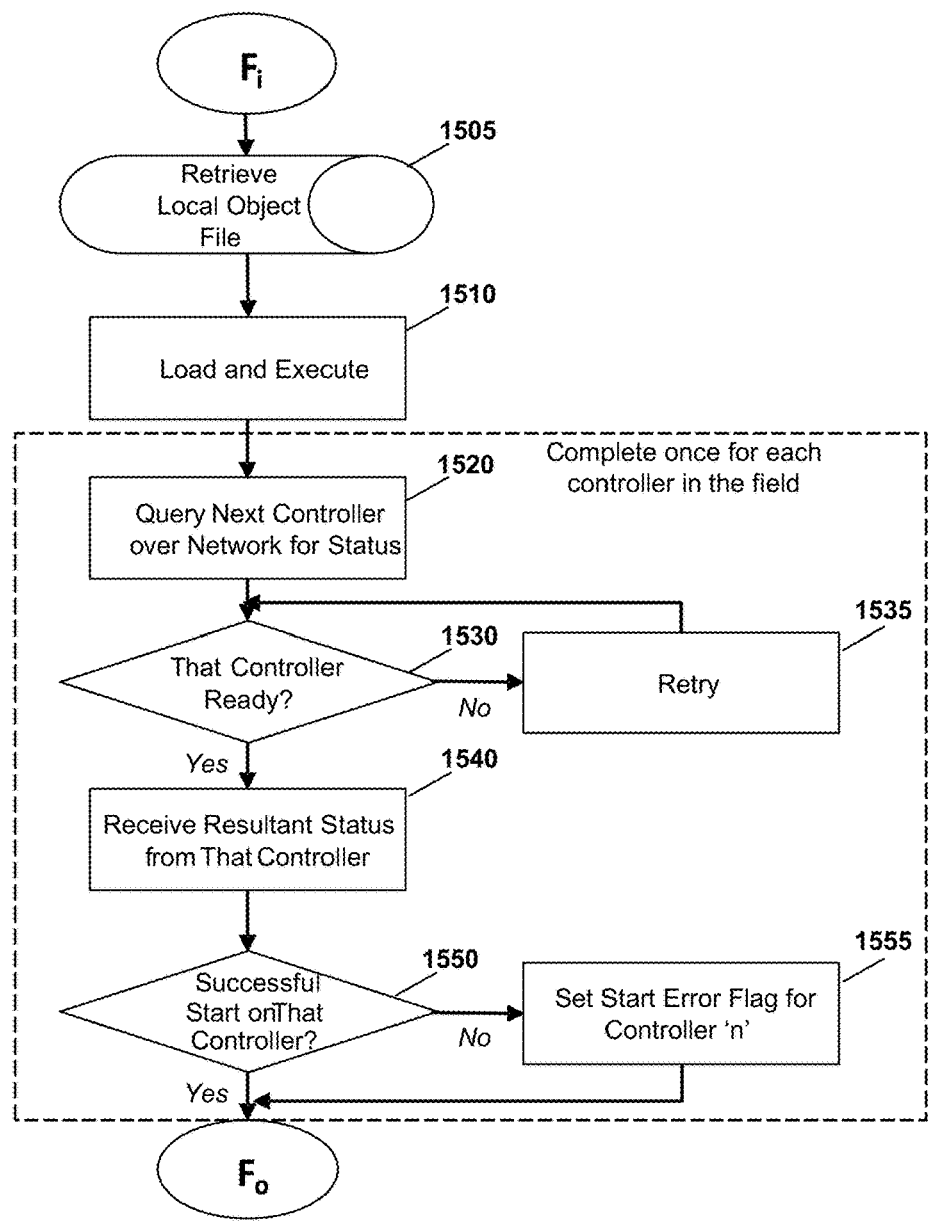
FIG. 15 depicts a flowchart of an example method for establishing remote co-processing for a controller and a control generation platform, in an embodiment.

FIG. 15 illustrates a flow chart of a sample method 1500 according to one or more further embodiments that configures a host-and-master device and a controller (e.g., independent controller; neural network connected controller, and so forth) for co-processing mode. At 1505, method 1500 can comprise retrieving a local object file and, at 1510, method 1500 can comprise loading and executing the local object file. At 1520, method 1500 can comprise querying a next controller over a network for a status. At 1530, method 1500 can comprise determining whether the next controller is ready. If the next controller is not ready, method 1500 can proceed to 1535 and retry the controller, and then return to 1530. If the next controller is ready, method 1500 can proceed to 1540 and can comprise receiving resultant status from the next controller. At 1550, method 1500 can comprise determining whether a successful start on the next controller has occurred. If yes, method 1500 can end; otherwise, method 1500 can proceed to 1555 and set a start error flag for controller 'n', and can end.

Figure 16:
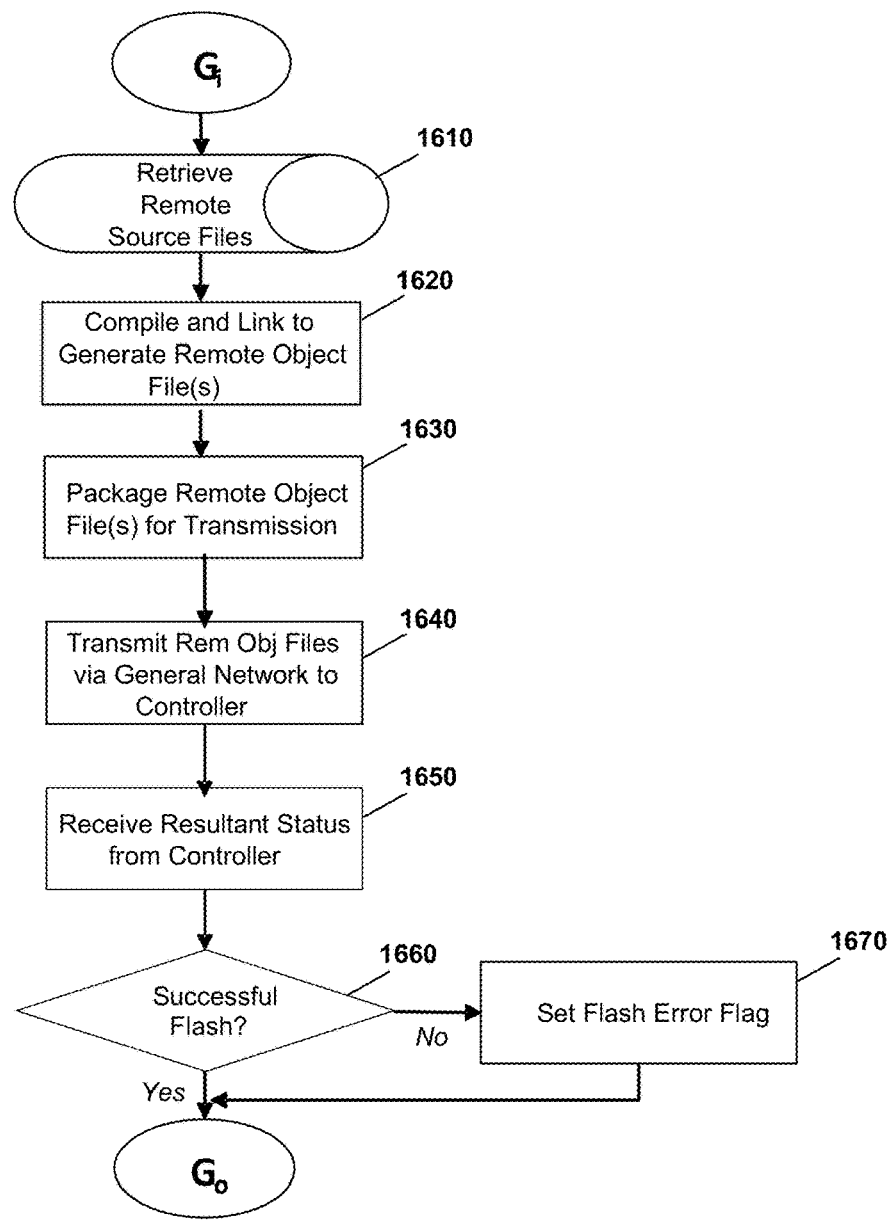
FIG. 16 depicts a flowchart of a sample method for generating, transmitting and confirming updated control programming to a conveyance controller.

FIG. 16 illustrates a flow chart of a sample method 1600 of an embodiment executing a remote flash process for loading new updates into controllers in the field when co-processing mode is not needed. At 1610, method 1600 can comprise retrieving remote source files and, at 1620, compiling and linking to generate remote object files. At 1630, method 1600 can comprise packaging a remote object file(s) for transmission, and at 1640, transmitting the remote object file(s) via general network to a controller. At 1650, method 1600 can comprise receiving a resultant status from the controller in response to transmitting the remote object file(s). At 1660, method 1600 can comprise determining whether the flash was successful in response to the resultant status. If successful, method 1600 can end; if unsuccessful, method 1600 can proceed to 1670 and set a flash error flag, and end.

Figure 17:
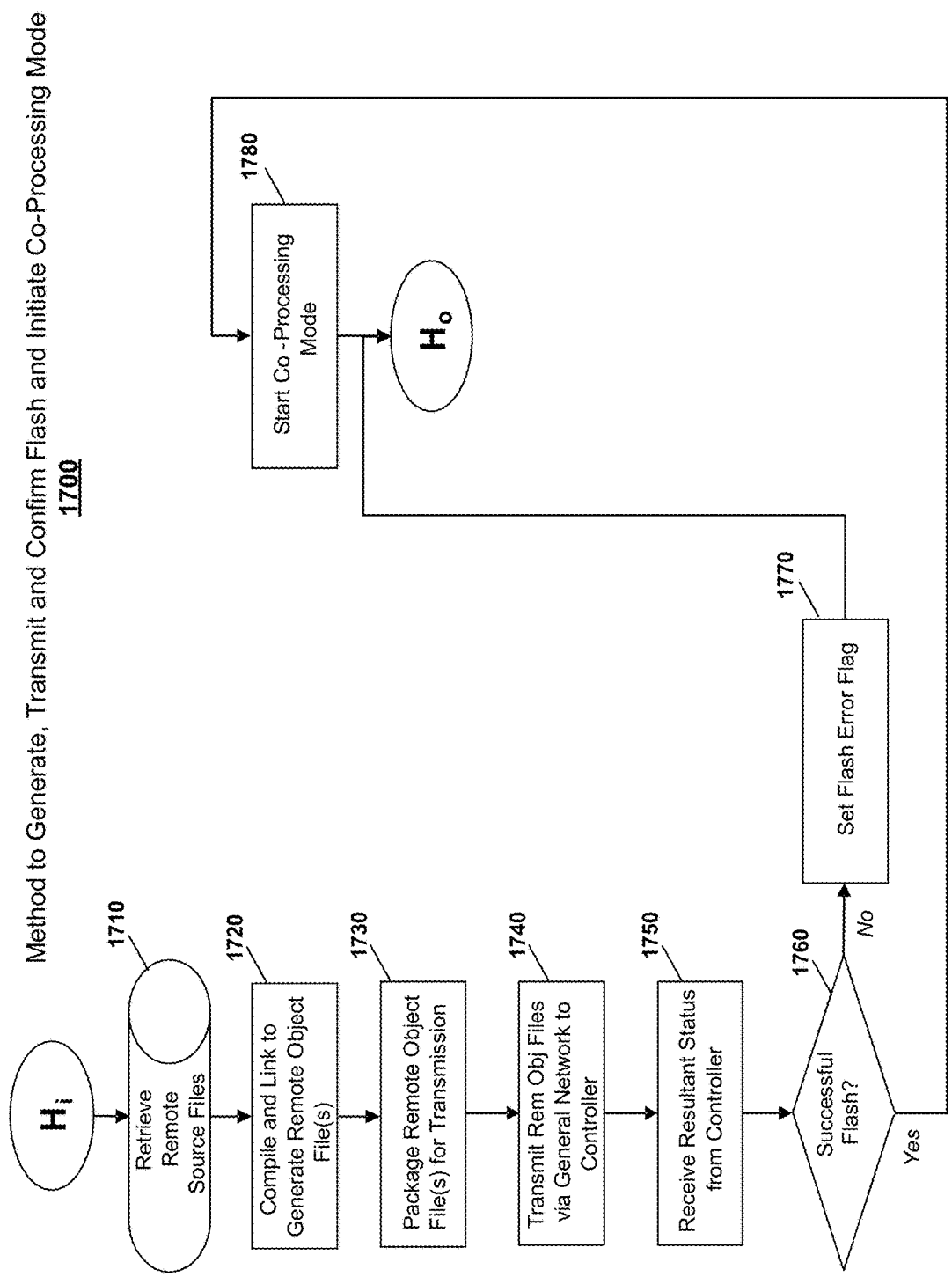
FIG. 17 illustrates a flowchart of an example method for generating, transmitting and confirming updated control programming and initiating co-processing.

FIG. 17 illustrates a flow chart of another example method 1700 directed to an embodiment for executing the remote flash process for loading new updates into controllers in the field and starting co-processing mode when co-processing mode is to be used. At 1710, method 1700 can comprise retrieving remote source files, and at 1720, method 1700 can further comprise compiling and linking to generate a remote object file(s). At 1730, method 1700 can comprise packaging the remote object file(s) for transmission, and at 1740, method 1700 can comprise transmitting the remote object file(s) via a general network to a controller. At 1750, method 1700 can comprise receiving a resultant status from the controller in response to transmitting the remote object file(s). At 1760, method 1700 can determine whether the flash was successful from the resultant status from the controller. If successful, method 1700 proceeds to 1780 and starts a co-processing mode. If unsuccessful, method 1700 proceeds to 1770 and sets a flash error flag, and then proceeds to 1780 to start the co-processing mode.

Figure 18:
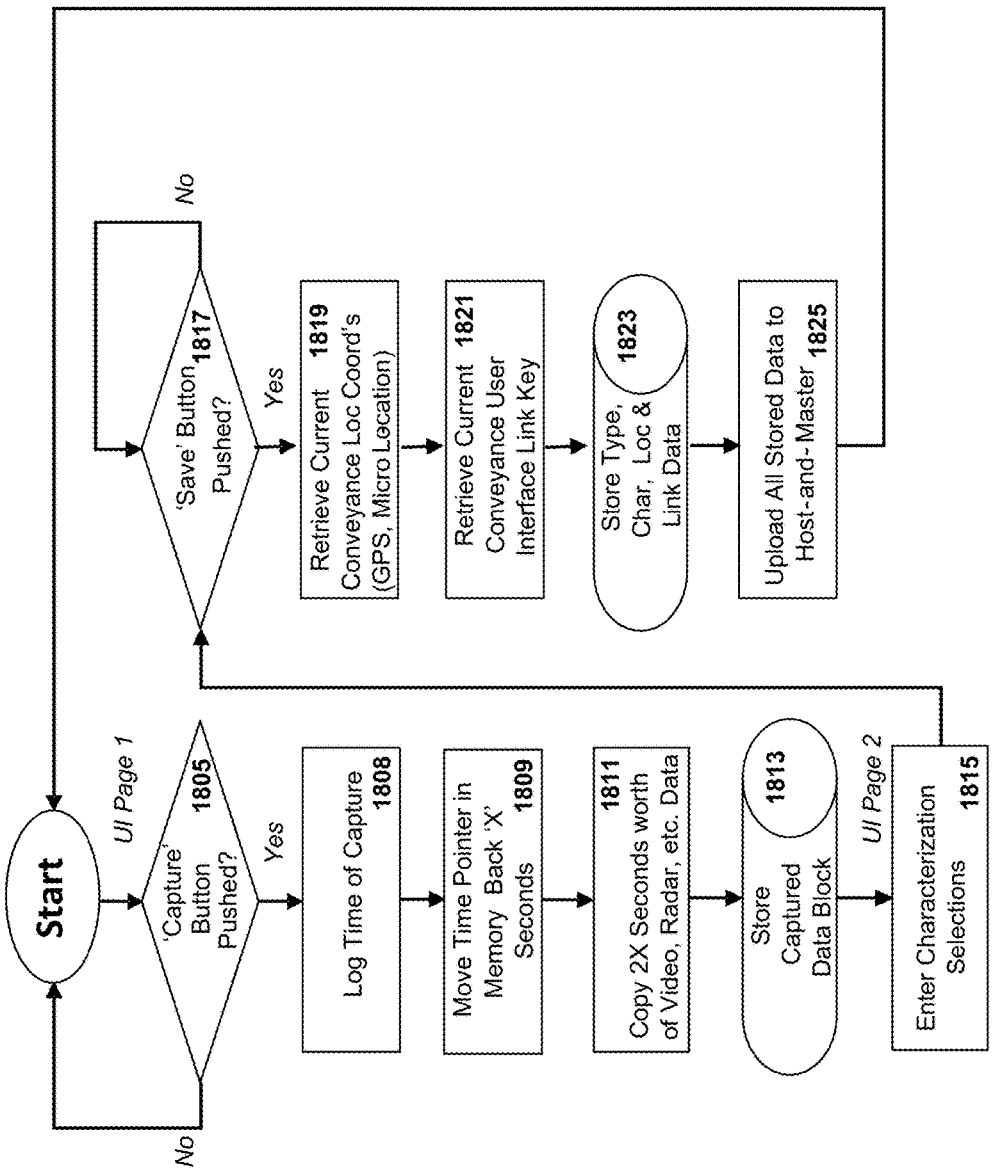

FIG. 18 illustrates a flow chart of still another method 1800 according to further embodiments of the present disclosure. For example, method 1800 can comprise executing the user interface on a hazard reporting device (e.g., a smartphone, tablet, smartwatch, computer, etc.) paired with, and dedicated to, a controller. At 1805, method 1800 can comprise determining whether a capture button or other hazard report initiation command has been activated on a user interface of the hazard reporting device (e.g., see FIG. 10, supra). If no, method 1800 returns to 1805; otherwise method 1800 proceeds to 1808. At 1808, method 1800 can comprise logging a time of capture associated with activation of the command. At 1809, method 1800 can comprise moving a time pointer in memory back "X" seconds (where X is a suitable fixed positive number determined by design choice, a variable positive number established by a hazard reporting application based on one or more conditions, or a variable value selected by a user of the hazard reporting device). At 1811, method 1800 can comprise copying 2X seconds (or other time metric) of sensor and imaging or other environment data (e.g., video, radar, etc.) and, at 1813, storing the captured data block. At 1815, method 1800 can comprise receiving hazard reporting characterization selections from a user interface of the hazard reporting device (e.g., see FIG. 10A, supra). At 1817, method 1800 can determine whether a save command (e.g., a save button, etc.) is activated at the hazard reporting device. If not, method 1800 returns to 1817; otherwise method 1800 proceeds to 1819. At 1819, method 1800 can comprise retrieving current location coordinates of a conveyance associated with the hazard reporting device and, at 1821, retrieving a current conveyance user interface link key for the hazard reporting device dedicated to the conveyance. At 1823, method 1800 can comprise storing type, characteristic and location information for the link data, and at 1825 method 1800 can comprise uploading all stored data to a host-and-master device.

Figure 18A:
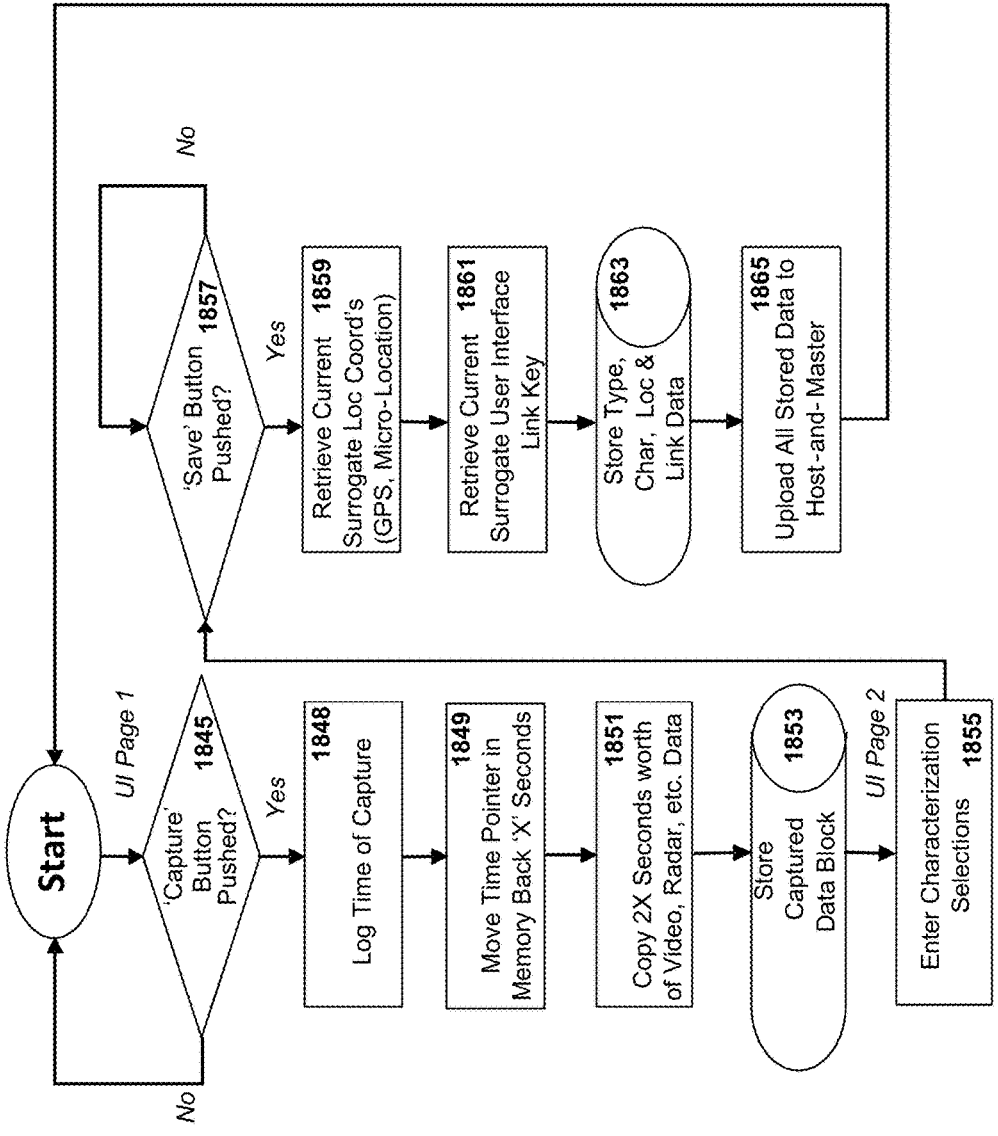

FIG. 18A illustrates a flow chart of yet another sample method 1800A of an embodiment executing the user interface on a hazard reporting device (e.g., computer, smartphone, tablet, smartwatch, etc.) paired with, and dedicated to, a surrogate device, as provided herein (e.g., a surrogate conveyance, etc.). At 1845, method 1800A can comprise determining whether a capture button or other hazard report initiation command has been activated on a user interface of the hazard reporting device (e.g., see FIG. 10, supra) of the surrogate conveyance. If no, method 1800A returns to 1845; otherwise method 1800A proceeds to 1848. At 1848, method 1800A can comprise logging a time of capture associated with activation of the command. At 1849, method 1800A can comprise moving a time pointer in memory back "X" seconds (where X is a suitable fixed positive number determined by design choice, a variable positive number established by a hazard reporting application based on one or more conditions, or a variable value selected by a user of the hazard reporting device). At 1851, method 1800A can comprise copying 2X seconds (or other time metric) of sensor and imaging or other environment data (e.g., video, radar, etc.) and, at 1853, storing the captured data block. At 1855, method 1800A can comprise receiving hazard reporting characterization selections from a user interface of the hazard reporting device (e.g., see FIG. 10A, supra). At 1857, method 1800A can determine whether a save command (e.g., a save button, etc.) is activated at the hazard reporting device. If not, method 1800A returns to 1857; otherwise method 1800A proceeds to 1859. At 1819, method 1800A can comprise retrieving current location coordinates of the surrogate conveyance associated with the hazard reporting device and, at 1861, retrieving a current surrogate conveyance user interface link key for the hazard reporting device dedicated to the surrogate conveyance. At 1863, method 1800A can comprise storing type, characteristic and location information for the link data, and at 1865 method 1800A can comprise uploading all stored data to a host-and-master device.

FIG. 18C illustrates a flow chart 1800B of an embodiment executing the user interface on a hazard reporting device as provided herein (e.g., a computer, smartphone, tablet, smartwatch, etc.) that is temporarily paired with a surrogate device. At 1875, method 1800B can comprise determining whether a capture button or other hazard report initiation command has been activated on a user interface of the hazard reporting device (e.g., see FIG. 10, supra) of the surrogate conveyance. If no, method 1800B returns to 1845; otherwise method 1800B proceeds to 1876.

At 1876, method 1800B can comprise requesting a current surrogate user interface temporary link key. At 1877, method 1800B can comprise storing temporary surrogate's location coordinates.

In addition, at 1878, method 1800B can comprise logging a time of capture associated with activation of the command. At 1879, method 1800B can comprise moving a time pointer in memory back "X" seconds (where X is a suitable fixed positive number determined by design choice, a variable positive number established by a hazard reporting application based on one or more conditions, or a variable value selected by a user of the hazard reporting device). At 1881, method 1800B can comprise copying 2X seconds (or other time metric) of sensor and imaging or other environment data (e.g., video, radar, etc.) and, at 1883, storing the captured data block. At 1885, method 1800B can comprise receiving hazard reporting characterization selections from a user interface of the hazard reporting device (e.g., see FIG. 10A, supra). At 1887, method 1800B can determine whether a save command (e.g., a save button, etc.) is activated at the hazard reporting device. If not, method 1800B returns to 1887; otherwise method 1800B proceeds to 1889. At 1889, method 1800B can comprise retrieving current location coordinates of the surrogate conveyance or with the hazard reporting device temporarily associated with the surrogate conveyance and, at 1891, retrieving a temporary surrogate user interface link key for the hazard reporting device. At 1893, method 1800B can comprise storing type, characteristic and location information for the link data, and at 1895 method 1800B can comprise uploading all stored data to a host-and-master device.

Description of Enabling Embodiments

In connection with FIG. 19, the systems and processes described below can be embodied within hardware, such as a single integrated circuit (IC) chip, multiple ICs, an application specific integrated circuit (ASIC), or the like. A suitable operating environment 1900 for implementing various aspects of the claimed subject matter includes a computer 1902 (which can be embodied by any other suitable processing device, such as a tablet computer, a smartphone, a smartwatch, among others). In various embodiments, a hazard reporting device can be embodied in part by computer 1902, or an analogous computing device known in the art, subsequently developed, or made known to one of ordinary skill in the art by way of the context provided herein.

The computer 1902 includes a processing unit 1904, a system memory 1910, a codec 1914, and a system bus 1908. The system bus 1908 couples system components including, but not limited to, the system memory 1910 to the processing unit 1904. The processing unit 1904 can be any of various available processors. Dual microprocessors and other multiprocessor architectures also can be employed as the processing unit 1904.

The system bus 1908 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1910 can include volatile memory 1910A, non-volatile memory 1910B, or both. Functions of a hazard reporting device, autonomous controller or host-and-master device described in the present specification can be programmed to system memory 1910, in various embodiments. The basic input/output system (BIOS), containing the basic routines to transfer information between elements within the computer 1902, such as during start-up, is stored in non-volatile memory 1910B. In addition, according to present innovations, codec 1914 may include at least one of an encoder or decoder, wherein the at least one of an encoder or decoder may consist of hardware, software, or a combination of hardware and software. Although, codec 1914 is depicted as a separate component, codec 1914 may be contained within non-volatile memory 1910B. By way of illustration, and not limitation, non-volatile memory 1910B can include read only memory (ROM), programmable ROM (PROM), electrically programmable ROM (EPROM), electrically erasable programmable ROM (EEPROM), or Flash memory. Non-volatile memory 1910B can be embedded memory (e.g., physically integrated with computer 1902 or a mainboard thereof), or removable memory. Examples of suitable removable memory can include a secure digital (SD) card, a compact Flash (CF) card, a universal serial bus (USB) memory stick, or the like. Volatile memory 1910A includes random access memory (RAM), which can serve as operational system memory for applications executed by processing unit 1904. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), and so forth.

Computer 1902 may also include removable/non-removable, volatile/non-volatile computer storage medium. FIG. 19 illustrates, for example, disk storage 1906. Disk storage 1906 includes, but is not limited to, devices such as a magnetic disk drive, solid state disk (SSD) floppy disk drive, tape drive, Flash memory card, memory stick, or the like. In addition, disk storage 1906 can include storage medium separately or in combination with other storage medium including, but not limited to, an optical disk drive such as a compact disk ROM device (CD-ROM) or derivative technology (e.g., CD-R Drive, CD-RW Drive, DVD-ROM, and so forth). To facilitate connection of the disk storage 1906 to the system bus 1908, a removable or non-removable interface is typically used, such as interface 1912. In one or more embodiments, disk storage 1906 can be limited to solid state non-volatile storage memory, providing motion and vibration resistance for a computing device operable in conjunction with a hazard reporting device, a conveyance, a controller or a host-and-master device.

Figure 19:
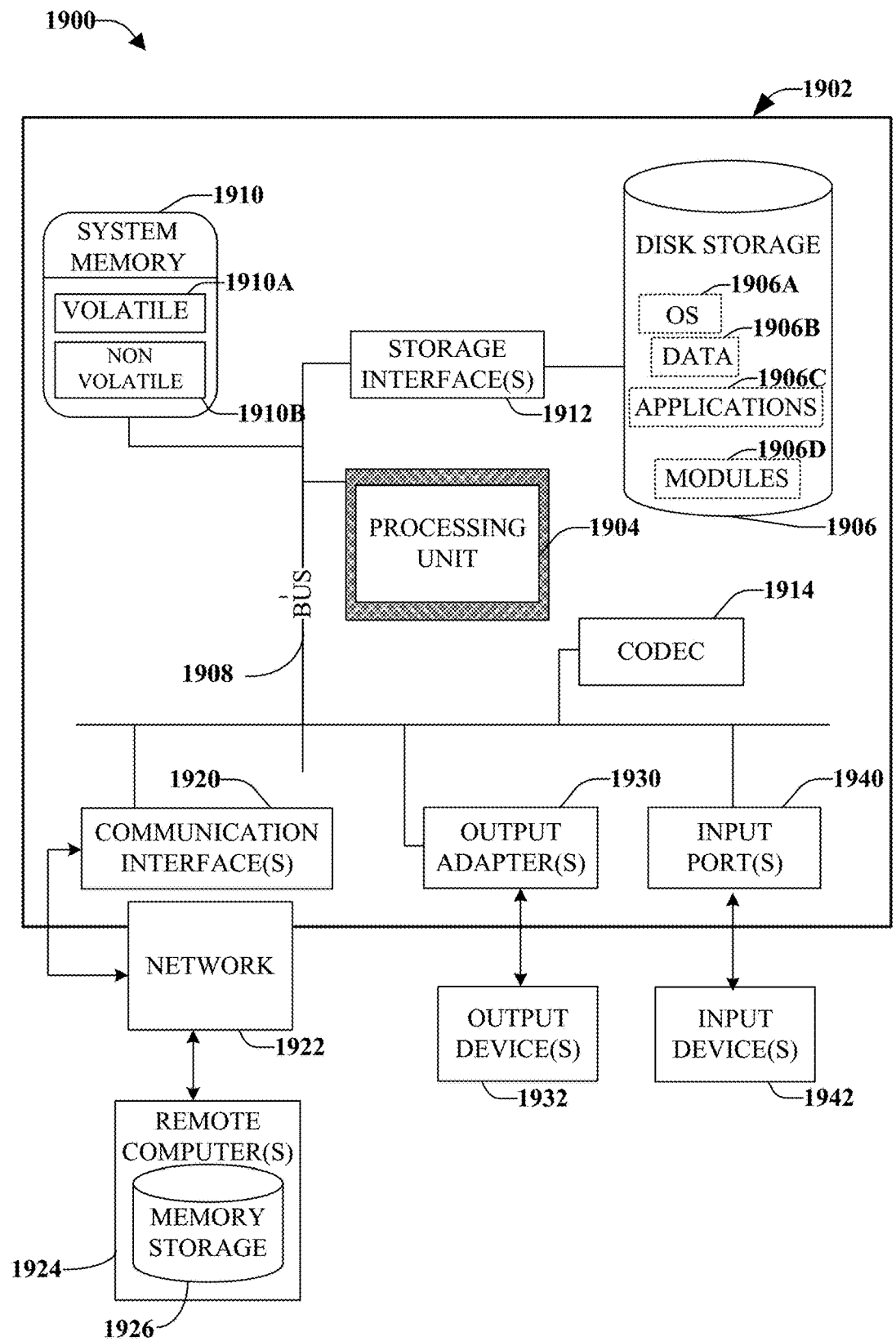
FIG. 19 depicts a diagram of an example computing environment for facilitating various embodiments of the present disclosure.

It is to be appreciated that FIG. 19 describes software that can program computer 1902 to operate as an intermediary between a user of a computing device (e.g., hazard reporting device, autonomous controller, and others) embodied within operating environment 1900. Such software includes an operating system 1906A. Operating system 1906A, which can be stored on disk storage 1906, acts to control and allocate resources of the computer 1902. Applications 1906C take advantage of the management of resources by operating system 1906A through program modules 1906D, and program data 1906B, such as the boot/shutdown transaction table and the like, stored either in system memory 1910 or on disk storage 1906. It is to be appreciated that the claimed subject matter can be implemented with various operating systems or combinations of operating systems.

Input device(s) 1942 connects to the processing unit 1904 and facilitates operator interaction with operating environment 1900 through the system bus 1908 via input port(s) 1940. Input port(s) 1940 can include, for example, a serial port, a parallel port, a game port, a universal serial bus (USB), among others. Output device(s) 1932 can use some of the same type of ports as input device(s) 1942. Thus, for example, a USB port may be used to provide input to computer 1902 and to output information from computer 1902 to an output device 1932. Output adapter 1930 is provided to illustrate that there are some output devices, such as graphic display, speakers, and printers, among other output devices, which require special adapters. The output adapter 1930 can include, by way of illustration and not limitation, video and sound cards that provide a means of connection between the output device 1932 and the system bus 1908. It should be noted that other devices or systems of devices provide both input and output capabilities such as remote computer(s) 1924 and memory storage 1926.

Computer 1902 can operate in conjunction with one or more electronic devices described herein. For instance, computer 1902 can embody an autonomous controller 101 configured to control engine/powerplant 151, transmission 152, driveline 153, torque or thrust vectoring 154, braking 155, steering or aero-surface movement 156, chassis or structure 157 or body/housing of conveyance 150. Additionally, computer 1902 can communicatively couple with locating devices 190, sensing and tracking devices 110, or host-and-master device 201 by way of network interface 130, among others. Thus, as depicted, computer 1902 can communicatively couple with various disclosed components by way of a network interface 1922 (e.g., a wireless network interface, a wired network interface, a global positioning system (GPS) interface, and so forth), in an embodiment.

Communication connection(s) 1920 refers to the hardware/software employed to connect the network interface 1922 to the system bus 1908. While communication connection 1920 is shown for illustrative clarity inside computer 1902, it can also be external to computer 1902. The hardware/software necessary for connection to the network interface 1922 includes, for exemplary purposes only, internal and external technologies such as, modems including regular telephone grade modems, cable modems and DSL modems, ISDN adapters, and wired and wireless Ethernet cards, hubs, and routers.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for management and training of networked controllers for autonomous conveyances, comprising:
    an input and reporting interface communicatively coupled by way of a first network to respective hazard reporting devices of a plurality of autonomous conveyances, the input and reporting interface configured to:
        receive first reporting data by way of the first network from a first hazard reporting device of the respective hazard reporting devices, the first reporting data containing first sensor measurement data determined by the first hazard reporting device to meet a safety criterion with respect to a first autonomous conveyance of the plurality of autonomous conveyances associated with the hazard reporting device;
        receive second reporting data by way of the first network from a second hazard reporting device of the respective hazard reporting devices, the second reporting data containing second sensor measurement data determined by the second hazard reporting device to meet the safety criterion or a second safety criterion with respect to a second autonomous conveyance of the plurality of autonomous conveyances;
        parse the first reporting data and the second reporting data to identify and extract the first sensor measurement data meeting the safety criterion and extract the second sensor measurement data meeting the safety criterion or the second safety criterion;
    a detection and monitoring device configured to receive the extracted first and second sensor measurement data and characterize a type or quantity of hazard or hazards resulting from the first and second sensor measurement data affecting the first and second autonomous conveyances;
    a control program generation and execution device configured to identify a set of actions to mitigate or avoid the characterized hazard or hazards from the first and second sensor measurement data, and generate updated control programming that updates a control algorithm executed by a controller device of a third autonomous conveyance of the plurality of autonomous conveyances without direct communication between the third autonomous conveyance and the first and second autonomous conveyances, wherein the updated control algorithm is configured to enable the controller device to independently operate the third autonomous conveyance according to the set of actions that mitigate or avoid the characterized hazard; and
    an off-board programming platform configured to distribute the updated control algorithm containing the updated control programming to at least a subset of the plurality of autonomous conveyances including the third autonomous conveyance by way of a second network.

2. The system of claim 1, further comprising a third-party reporting platform that facilitates quantitative or qualitative reporting of safety hazard conditions independent of the networked controllers, wherein the input and reporting interface is configured to receive a report of a safety hazard condition via the first network or a third network from the third-party reporting platform, and further wherein the control program generation and execution device is configured to incorporate the report of the safety hazard condition in conjunction with updating the control algorithm, or is configured to generate second updated control programming that further updates the control algorithm to cause the controller device to perform a second set of actions to mitigate or avoid the safety hazard condition identified by the report of the safety hazard condition.

3. The system of claim 1, wherein the off-board programming platform is further configured to distribute the updated control algorithm to a second plurality of autonomous test conveyances by way of a third network, which are not yet deployed in the field.

4. The system of claim 1, wherein the detection and monitoring device is further configured to compare sensor measurement data to stored data pertaining to a set of hazards or potential hazards defined for the autonomous conveyance, and further comprises classification logic configured to provide a quantification of Safety Criticality Level (SCL) for each hazard or potential hazard monitored by the detection and monitoring device.

5. The system of claim 4, wherein the detection and monitoring device further comprises cross check logic configured to compare separate data sets received from multiple sources of object, obstacle and hazard data together with the classification logic, and further configured to employ harmonization logic to determine a most probably correct data set of the separate data sets.

6. The system of claim 5, wherein the cross check logic is further configured to determine a set of data of the separate data sets having a probability of being untrue data, wherein the cross check logic is configured to mark the set of data as untrue data, to be ignored by the control program generation and execution device.

7. The system of claim 4, wherein the set of hazards or potential hazards includes hazards classified by a published standards organization hazard definition in combination with novel hazard identifications generated, characterized or quantified by the system for management and training of networked controllers and updated to the published standards organization hazard definitions.

8. The system of claim 7, wherein the published standards organization hazard definitions include the International Standards Organization published hazard standard, or a Society of Automotive Engineering (SAE) published hazard standard, or a combination of the foregoing.

9. The system of claim 1, wherein the control program generation and execution device references a database of existing hazard mitigation or avoidance protocols and conditions generating the updated control programming on determining the database of existing hazard mitigations or avoidance protocols do not mitigate or avoid the characterized hazard.

10. The system of claim 1, wherein the control program generation and execution device references a database of hardware and software capacity to determine whether sufficient hardware capacity exists for the set of actions to be performed to mitigate or avoid the characterized hazard, and implements the updated control programming to accommodate updated hardware requirements if sufficient hardware capacity exists for the set of actions.

* * * * *